(12) United States Patent
Apsangi et al.

(10) Patent No.: US 8,621,540 B2
(45) Date of Patent: Dec. 31, 2013

(54) APPARATUS AND METHODS FOR PROVISIONING IN A DOWNLOAD-ENABLED SYSTEM

(75) Inventors: Shrikant Apsangi, Fairfax, VA (US); Srinivas Guduru, Herndon, VA (US); Jason Kazimir Schnitzer, Boulder, CO (US); Jeffrey P. Markley, Golden, CO (US); John B. Carlucci, Boulder, CO (US); John G. Bevilacqua, Boulder, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1847 days.

(21) Appl. No.: 11/657,828

(22) Filed: Jan. 24, 2007

(65) Prior Publication Data

US 2008/0177998 A1    Jul. 24, 2008

(51) Int. Cl.
*H04N 7/16* (2011.01)
*H04N 7/167* (2011.01)
*H04N 7/173* (2011.01)
*H04L 9/00* (2006.01)
*H04L 29/06* (2006.01)
*G06F 7/04* (2006.01)
*G06F 17/30* (2006.01)
*G06F 12/00* (2006.01)
*G06F 15/16* (2006.01)
*G06F 13/00* (2006.01)
*G11C 7/00* (2006.01)

(52) U.S. Cl.
USPC ........ 725/116; 725/1; 725/2; 725/25; 725/31; 380/239; 380/262; 380/264; 726/2; 726/3; 726/4; 726/21; 726/29

(58) Field of Classification Search
USPC ............... 725/2–27, 31; 705/50–51; 380/239; 726/21
See application file for complete search history.

(56) References Cited

U.S. PATENT DOCUMENTS

| | | | |
|---|---|---|---|
| 5,982,412 A | 11/1999 | Nulty | |
| 6,009,103 A | 12/1999 | Woundy | |
| 6,233,687 B1 | 5/2001 | White | |
| 6,657,991 B1 | 12/2003 | Akgun et al. | |
| 6,957,328 B2 * | 10/2005 | Goodman et al. | 713/2 |
| 6,985,355 B2 * | 1/2006 | Allirot | 361/679.4 |
| 7,016,963 B1 * | 3/2006 | Judd et al. | 709/228 |
| 7,055,040 B2 * | 5/2006 | Klemba et al. | 713/156 |
| 7,092,397 B1 | 8/2006 | Chandran et al. | |
| 7,107,326 B1 | 9/2006 | Fijolek et al. | |
| 7,154,912 B2 | 12/2006 | Chong et al. | |
| 7,174,371 B2 | 2/2007 | Elo et al. | |
| 7,194,756 B2 | 3/2007 | Addington et al. | |

(Continued)

*Primary Examiner* — Mushfikh Alam
(74) *Attorney, Agent, or Firm* — Gazdzinski & Associates, PC

(57) ABSTRACT

Apparatus and methods for provisioning of customer premise equipment (CPE) equipped with a secure microprocessor to receive e.g., digital video content by entering unique identification of the CPE at one or more servers located at the headend or other location of a content-based network. In one embodiment, the CPE comprises a download-enabled (e.g., DCAS) host with embedded cable modem and embedded set-top box functionality, and the provisioning includes enabling DOCSIS functionality of the CPE, assigning an IP address to the CPE and providing the CPE with a client image for the conditional access system chosen by the network operator. In one variant, the network operator can deactivate a provisioned device while connected to the network, as well when disconnected from the network. The network operator can also add, delete or replace conditional access client image in a provisioned device.

27 Claims, 21 Drawing Sheets

(56) References Cited

U.S. PATENT DOCUMENTS

| | | | |
|---|---|---|---|
| 7,225,333 B2 * | 5/2007 | Peinado et al. | 713/164 |
| 7,228,427 B2 | 6/2007 | Fransdonk | |
| 7,289,534 B1 | 10/2007 | Bailey et al. | |
| 7,305,460 B2 | 12/2007 | Park | |
| 7,313,611 B1 | 12/2007 | Jacobs et al. | |
| 7,330,967 B1 * | 2/2008 | Pujare et al. | 713/2 |
| 7,730,321 B2 * | 6/2010 | Gasparini et al. | 713/182 |
| 7,752,617 B2 * | 7/2010 | Blinick et al. | 717/170 |
| 8,332,370 B2 * | 12/2012 | Gattegno et al. | 707/695 |
| 2002/0126654 A1 * | 9/2002 | Preston et al. | 370/352 |
| 2002/0129358 A1 | 9/2002 | Buehl et al. | |
| 2003/0041336 A1 * | 2/2003 | Del Sordo et al. | 725/140 |
| 2003/0048380 A1 | 3/2003 | Tamura | |
| 2003/0056217 A1 | 3/2003 | Brooks | |
| 2003/0069965 A1 | 4/2003 | Ma et al. | |
| 2003/0217365 A1 | 11/2003 | Caputo | |
| 2004/0260798 A1 | 12/2004 | Addington et al. | |
| 2005/0015810 A1 | 1/2005 | Gould et al. | |
| 2006/0047957 A1 | 3/2006 | Helms | |
| 2006/0137005 A1 * | 6/2006 | Park | 726/21 |
| 2006/0200856 A1 * | 9/2006 | Salowey et al. | 726/5 |
| 2006/0218604 A1 | 9/2006 | Riedl | |
| 2007/0022459 A1 | 1/2007 | Gaebel | |
| 2007/0046791 A1 * | 3/2007 | Wang et al. | 348/231.6 |
| 2007/0094691 A1 | 4/2007 | Gazdzinski | |
| 2007/0157295 A1 | 7/2007 | Mangalore et al. | |
| 2007/0192615 A1 * | 8/2007 | Varghese et al. | 713/182 |
| 2007/0217436 A1 | 9/2007 | Markley | |
| 2008/0008321 A1 | 1/2008 | Gagnon et al. | |
| 2008/0098212 A1 * | 4/2008 | Helms et al. | 713/155 |
| 2008/0256510 A1 * | 10/2008 | Auerbach | 717/107 |
| 2009/0007234 A1 * | 1/2009 | Birger et al. | 726/3 |
| 2010/0185855 A1 * | 7/2010 | Margolus et al. | 713/165 |

* cited by examiner

APPARATUS AND METHODS FOR PROVISIONING IN A DOWNLOAD-ENABLED SYSTEM

RELATED APPLICATIONS

This application is related to U.S. patent application Ser. No. 11/006,404 filed Dec. 7, 2004 and entitled "Technique For Securely Communicating And Storing Programming Material In A Trusted Domain", (issued as U.S. Pat. No. 8,312,267), which is incorporated herein by reference in its entirety. This application is also related to U.S. patent application Ser. No. 11/584,208 filed Oct. 20, 2006 and entitled "Downloadable Security And Protection Methods And Apparatus", (issued as now U.S. Pat. No. 8,520,850), which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention relates in one exemplary aspect to provisioning a consumer premises device (e.g., set-top box) in a network having download capability; e.g., such as for conditional access, digital rights management, or trusted domain functionality.

2. Description of Related Technology

Recent advances in digital information processing have made a wide range of services and functions available for delivery to consumers at their premises for very reasonable prices or subscription fees. These services and functions include digital programming (movies, etc.), digital video-on-demand (VOD), personal video recorder (PVR), Internet Protocol television (IPTV), digital media playback and recording, as well high-speed Internet access and IP-based telephony (e.g., VoIP). Other services available to network users include access to and recording of digital music (e.g., MP3 files), as well local area networking (including wire-line and wireless local area networks) for distributing these services throughout the user's premises, and beyond.

Currently, many of these services are provided and delivered to the user via a wide variety of different equipment environments including, inter alia, cable modems, WiFi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

The myriad of services, equipment and providers can easily create confusion and economic inefficiency for someone using many of these services on a regular basis. In particular, a user may have to pay for each service or equipment separately, thus eliminating any economies of scale based on integration. Additionally, the equipment or services may not interoperate with one another, thus reducing the overall utility provided to the user, and increasing their frustration level. These problems are particularly acute when the number of different services utilized (and hence number of service providers) is high.

Some improvements in digital service integration have been made over time. For example, cable system subscribers (such as those of the Assignee hereof) can now access VOD, PVR, PPV and broadcast services simultaneously, as well a Internet access via cable modem, and even digital telephony (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is quite limited.

Moreover, the movement of content delivered by these services within the user's premises (or even outside) is substantially frustrated, largely due to concerns relating to protection of valuable (e.g., copyrighted) content and surreptitious reproduction and distribution. Such unauthorized reproduction and distribution not only detracts from the network operator's revenue and commercial viability, but also that of the content source (e.g., movie studio, recording studio/artist, etc.).

Moreover, the lack of a comprehensive and effective scheme for control of content within the user domain effectively precludes content providers from releasing new content over cable or satellite networks contemporaneous with its availability over retail or rental outlets, due in large part to unauthorized access, reproduction and distribution concerns. Stated simply, new release content availability over cable typically lags that of rental/retail, due primarily to the lack of an effective control mechanism for the content once it is delivered to the user domain.

A number of existing technologies have heretofore been employed by network operators in order to attempt to frustrate surreptitious access, copying and distribution of valuable content.

Conditional Access

For example, so-called Conditional access (CA) technologies are typically incorporated into content-based networks, such technologies including the digital encoding of various types of data including audio and video programming and music. Conditional access can generally be defined as the control of when and how a user may view and use the associated programming or information. Different types of conditional access may be desirable in a network delivery system in order to, e.g., accommodate improvements in the technology over time, as well as different conditional access attributes such as security and category of programming or user access level.

A variety of traditional methods of conditional access exist including, e.g., "Powerkey™", VideoGuard®, and DigiCipher®. A generalized conditional access model is also provided by the well-known DVB (Digital Video Broadcasting) Specification TS 101 197 V1.2.1 (02/02), DVB SimulCrypt; Part 1: "Head-end architecture and synchronization", and TS 103 197 V1.2.1 (02/02): "Head-end Implementation of SimulCrypt", each incorporated herein by reference in its entirety. These can be implemented using, for example, the so-called "CableCARD™" plug-in security module access technology (also known as a "a point-of-deployment (POD) module"). See, e.g., the CableCARD-Host interface specification, which defines the interface between a digital cable receiver or STB (Host device) and the CableCARD device provided by the MSO/cable operator. CableCARD was developed to satisfy certain security requirements to allow retail availability of host devices, e.g., set-top boxes, digital cable ready televisions, DVRs, personal computers (PCs), integrated digital televisions, etc., for receiving cable services. The CableCARD, comprising a PCMCIA device, can be inserted into a host device, allowing a viewer to receive cable systems' secure digital video services, e.g., pay per view TV, electronic program guides, premium subscription channels, etc.

Encryption

In many content-based networks (e.g., cable television systems), the client device or consumer premises equipment (CPE) receives, through the cable TV network, programming content which may be encrypted, e.g., in accordance with the Data Encryption Standard (DES) technique or Advanced Encryption Standard (AES), to secure its delivery.

DES is a well-known symmetrical cipher that utilizes a single key for both encryption and decryption of messages. Because the DES algorithm is publicly known, learning the DES key would allow an encrypted message to be read by anyone. As such, both the message sender and receiver must keep the DES key a secret from others. A DES key typically is a sequence of eight bytes, each containing eight bits. To enhance the DES integrity, the DES algorithm may be applied successive times. With this approach, the DES algorithm enciphers and deciphers data, e.g., three times in sequence, using different keys, resulting in a so-called triple DES (3DES) technique.

The Advanced Encryption Standard (AES), also known as Rijndael, is a block cipher adopted as an encryption standard by many entities including the U.S. government. It is used worldwide, as is the case with its predecessor, DES. AES was adopted by National Institute of Standards and Technology (NIST) and was codified as US FIPS PUB 197 in November 2001.

AES has a fixed block size of 128 bits and a key size of 128, 192 or 256 bits. The key is expanded using the well-known Rijndael key schedule. Most of AES calculations are performed in a special finite field. AES typically operates on a 4×4 array of bytes, termed the state.

AES provides a much higher level of encryption than DES or 3DES, and hence is increasingly being integrated into applications where strong protection is desired, including the delivery of content over cable or other content-based networks.

In contrast to the DES or AES techniques, a public key encryption technique, e.g., an RSA technique (named for its developers, Rivest, Shamir, and Adleman), uses two different keys. A first key, referred to as a private key, is kept secret by a user. The other key, referred to as a public key, is available to anyone wishing to communicate with the user in a confidential manner. The two keys uniquely match each other, collectively referred to as a "public \-private key pair." However, the private key cannot be easily derived from the public key.

"Trusted Domains"

Another related approach for content protection comprises the creation and enforcement of a "trusted domain" or TD. Specifically, such a "trusted domain" (TD) comprises an area (physically or virtually) within which programming or other content is protected from unauthorized access, distribution and copying. For example, in a cable network, a trusted domain may include not only the network portion where programming content traditionally is secured by, and within total control of, a cable operator (including, e.g., the headend, HFC delivery network, etc.,) but also user devices or customer premises equipment (CPE) at subscribers' premises which are capable of receiving and securely storing programming content. Using the trusted domain approach, the network operator can guarantee certain subscriber access, distribution, and usage policy enforcement with respect to content held within the domain. For example, a digital representation of a movie held within an operator's TD (e.g., on a hard drive of a user device) cannot be distributed over the Internet, wireless network, etc. in viewable form, and cannot become a source for duplication of multiple viewable copies.

One exemplary approach of implementing a trusted domain, described in co-owned and co-pending U.S. patent application Ser. No. 11/006,404 filed Dec. 7, 2004 and entitled "Technique For Securely Communicating And Storing Programming Material In A Trusted Domain", (issued as U.S. Pat. No. 8,312,267), which is incorporated herein by reference in its entirety, comprises using two cryptographic elements (e.g., encryption keys), associated with a user and his/her client device(s), respectively, that control access to content stored in the client device(s) within the domain.

The trusted domain is preserved with respect to the stored content so long as the content remains encrypted and continues to be managed under the above-described key management methodology, regardless of which device stores the content. Once the content itself is decrypted, e.g., by a conditional access (CA) mechanism when data is sent from the SDVR CPE to a television monitor for display, the decrypted content is no longer within the trusted domain.

Digital Rights Management (DRM) and Steganograhy

Another approach used to control the distribution and use of protected content within a content-based network is to employ so-called digital rights management (DRM). For example, Media rights management systems such as the Microsoft Windows® Media Digital Rights Manager (DRM), may be used as well. The Windows® Media Player Version 9 comprises audio and video codecs, the Windows Media Encoder, Windows Media Server, Windows Media Software Development Kit (SDK), Digital Rights Management (DRM) technology, and an extensibility model that allows integration into third-party solutions.

According to one such DRM approach, a digital media or content file is encrypted and locked with a "license key." The license key is stored in a license file or other data structure which is distributed separately from the media or content. A user can obtain the encrypted media file by, e.g., downloading it from a web site, purchasing it on a physical media, etc. To play the digital media file, the user must first acquire the license file including the license key for that media file.

Another approach to DRM (see, e.g., the RealNetworks "Helix" Platform and Community approach) comprises encrypting a content file (typically performed by the system operator) to create a secured content file, thereby requiring a cryptographic key to access the content in the file. The key is included within a retailer's database, and the secured content file is distributed to users by, e.g., Internet connection or offline distribution of CDs. The retailer itself sets usage rules and policies for licensing the content. A user contacts the retailer's web server, such as via a trusted software client, in order to obtain a license to access the encrypted content. The retailer's web server requests certain rights from the operator's license server, the latter which creates a license containing the key for the requested content file.

Related to DRM is the practice of steganography. Steganography is the art and science of including hidden data in such a way that no one apart from the intended recipient or sender knows of the existence of the data; this is in contrast to cryptography, where the existence of the data itself is not disguised, but the content is obscured. For example, digital steganographic data may included within the recorded data/content, such as digital watermarking data.

Emerging Technologies and Provisioning Requirements

More recently, emerging technologies have focused on so-called "downloadable" conditional access systems (DCAS), which are intended to be implemented in next-generation two-way, cable-ready digital TV sets, set-top boxes and/or other related devices. This "download" approach would enable cable operators to download conditional access software directly to TV sets, set-top boxes and other digital entertainment devices in the subscribers' premises, and would be especially suited to interactive services such as VOD, PVR, etc. This would also obviate the physical CableCARD form factor.

With the so-called FCC "navigation order" (Further Notice of Proposed Rulemaking ("FNPRM"), FCC 00-341, adopted Sep. 14, 2000; released Sep. 18, 2000; relating to, inter alia, the adoption of unidirectional plug and play, cable system operators are also required to support digital cable-ready devices on their systems. Downwloadable conditional access (CA) functionality is one proposed conditional access technology that also meets this requirement. In addition to the requirements imposed by FCC 03-225, it is also desirable to support bi-directional cable-ready devices on its systems, as well as "separable security" functionality (i.e., the CA functionality is physically, or at least logically) separable from the host device. Ideally, such enhanced functionality would also allow both basic bi-directional functions (so-called single-stream devices) as well as the use of more advanced multi-stream devices such as digital video recorders (DVRs). It is also desirable to allow download-enabled devices to participate (ad hoc or otherwise) in the operator's trusted domain (TD).

In recent years, numerous systems for providing interconnectivity among devices in a premises (e.g., home, enterprise, university, etc.) have been developed, allowing premises networks to include DSTBs, personal computers, cellphones, PDA devices, etc. Because of the increasing popularity of premises networking and the demand for seamless interconnectivity between heterogeneous hardware/software environments (e.g., "plug and play"), there is a growing need for a strategy that enables a user to perform authorized transfer of protected content, e.g., transferring content from their cable system CPE to other devices in a premises network, or even outside of the network, and at the same time prevent unauthorized distribution and reproduction of the protected content. The foregoing CA, DRM, steganographic, and trusted domain technologies, while providing some degree of protection, simply do not support such control and protection within the increasingly complex user domain.

Specifically, these techniques do not support cryptographic key management and distribution systems that operate with both legacy or new CA systems, and are not under direct network operator (e.g., MSO) control. They also accordingly do not support advanced provisioning techniques which would allow the operator to maintain configuration control and databases (e.g., address allocation, billing, etc.), device enablement/deactivation, and so forth.

Moreover, such existing techniques often cannot be smoothly integrated with retail (third party) devices, and are typically quite platform specific. They are often also specific to the content delivery mode (i.e., VOD, broadcast, broadcast-switched, and other content delivery paradigms).

These existing techniques also will not support seamless transition between independent implementations of CA, trusted domain, and DRM security features and policies, and are not standardized to any significant degree.

Prior art conditional access (CA) systems such as the Scientific Atlanta "Powerkey" approach described above have no authentication entity or "proxy" that can authenticate CPE or other connected devices in anticipation of providing download services, and hence by nature are highly localized. Generally speaking, any "trusted domains" that might be established are not extendable beyond the CPE on the client side of the delivery network.

Moreover, the aforementioned DCAS and other such "downloadable" CA approaches require special provisioning capabilities not present in such prior art devices or systems. This stems largely from the fact that a unique, secure entity (e.g., the SM or secure microprocessor) is resident on each DCAS host, and the ability to download common and personalized images to this device requires specific controls and protocols, which also extend into the network operator's billing and content provisioning systems. For example, the DCAS approach provides the capability to simultaneously support multiple CA system instances and servers within the same network topology. That is, a given host could have access to one or more CA systems, and the provisioning system must be able to direct the host to the desired CA system based on considerations including e.g., compatibility, host capability, service profile, and other administrative and operational considerations. New administrative policies to provide device revocation, and to monitor and control the state of a specific host given its key status (as reported by e.g., a trusted authority) must be supported also. The provisioning system must also be able to support configuration control for each CA, DRM, and TD/ASD host in the network.

A variety of different approaches to network device provisioning are known in the prior art. For example, U.S. Pat. No. 5,982,412 to Nulty issued Nov. 9, 1999 entitled "Coaxial testing and provisioning network interface device" discloses a broadband network for providing broadband signals, such as cable television signals, to a subscriber location that includes a network interface device installed at the subscriber's end of the broadband network. The network interface device includes circuitry that provides for the selective provisioning of services to the subscriber location from the broadband network and a test circuit that can be selectively connected for testing signals appearing on the broadband network.

U.S. Pat. No. 6,009,103 to Woundy issued Dec. 28, 1999 entitled "Method and system for automatic allocation of resources in a network" discloses a method and system for automatically allocating network resources such as IP addresses to control access to the network by utilizing at least one DHCP server, and a common network database formed from a LDAP directory for storing respective user configuration parameters, hardware address registration, and current binding information. A DHCP server can add new hardware address registrations to the LDAP using an "unregistered" service class. The DHCP server sends a DHCP reply tailored for unregistered devices, such as by allocating a privately-allocated IP address with no Internet access, or an IP address for a self-provisioning web server. A DHCP server views IP address allocation as indefinite, while a user will view an IP address allocation as having a short duration. Thus, if the IP network configuration does not change, the user terminal will continue to receive the same allocated IP address due to the DHCP server's perception of an indefinite lease.

U.S. Pat. No. 6,233,687 to White issued May 15, 2001 entitled "Method and apparatus for providing configuration information in a network" discloses a method and apparatus for providing message authentication between a first device (such as a provisioning server) and a plurality of other devices (such as cable modems) without need to share a secret key between the first device and the plurality of second devices.

U.S. Pat. No. 6,657,991 to Akgun, et al. issued Dec. 2, 2003 and entitled "Method and system for provisioning network addresses in a data-over-cable system" discloses a method and system for provisioning network addresses in a data-over-cable system. Provisioning of network addresses allows multiple "always-on" network devices with multiple associated devices to be used on a data-over-cable system with a limited public network address pool. The "always-on" network devices provide services, such as, Voice over Internet Protocol ("VoIP"), that typically require instant access to data-over-cable system. Network devices such as "always-on" cable modems may allocated private network addresses (e.g., Internet Protocol addresses) on the data-over-cable system. The private network addresses are not addressable outside the data-over-cable system. Other network devices associated with the cable modems, such as customer premise equipment, may be allocated public network addresses (e.g., Internet Protocol Addresses) on the data-over-cable system. The public network addresses are addressable outside the data-over-cable system. The network address provisioning is accomplished by selecting a private network address marker and a public network address marker for selected network devices and using an extended Address Resolution Protocol table to determine a device type. The private network address marker or public network address marker is added to a Dynamic Host Configuration Protocol message field by a cable modem termination system. A Dynamic Host Configuration Protocol server uses the private or public address marker to allocate a private network address or a public network address on the data-over-cable system.

U.S. Pat. No. 7,092,397 to Chandran, et al. issued Aug. 15, 2006 entitled "Method and apparatus for mapping an MPLS tag to a data packet in a headend" discloses a method of using DOCSIS 1.1 features to allow the addition of ISPs and QOS levels to a single cable modem without having to modify the CMTS is described in the various figures. Instead of using the SID of a data packet to determine the VPN tag of a data packet (DOCSIS 1.0), a service flow is used to identify the appropriate tag. This is done using the DOCSIS 1.1 configuration file. By doing so, the need for creating additional sub-interfaces in the cable modem interface does not arise. Instead, the configuration is modified at the provisioning server, i.e., the DHCP/TFTP server.

U.S. Pat. No. 7,107,326 to Fijolek, et al. issued Sep. 12, 2006 entitled "Method and system for integrating IP address reservations with policy provisioning" discloses a method and system for policy provisioning and access managing on a data-over-cable system. One method includes receiving a first message on a first network device such as a CMTS from a second network device and marking the first message with an identifier of a network access device. The method further includes intercepting the first message on a third network device prior to a first protocol network server such as a Dynamic Host Configuration Protocol ("DHCP") server receives the first message. When the third network device intercepts the first message, the third network device determines the identity of the second network device. Based on the identity of the second network device and using the identifier of the network access device, the third network device manages an assignment of configuration parameters for the second network device.

U.S. Pat. No. 7,154,912 to Chong, et al. issued Dec. 26, 2006 entitled "System and method for provisioning broadband service in a PPPoE network using a list of stored domain names" discloses a modem that includes a list of the multiple domain names. Each of the domain names is associated with a different Broadband Service Node (BSN). A PPPoE session is established, and an authentication request, containing the identifier and a generic password, is transmitted from a modem to multiple domain names over the PPPoE network. Subsequently, authorization is received from at least one of the domain names. The authorization preferably comprises at least one static Internet Protocol (IP) address. The modem then obtains full configuration details from an Internet Service Provider (ISP). A system and a computer program product for provisioning broadband service in a Point-to-Point Protocol Over Ethernet (PPPoE) network is also disclosed.

United States Patent Application Publication No. 20020129358 to Buehl, et al. published Sep. 12, 2002 entitled "Cable billing systems and methods enabling independence of service marketing and provisioning from billing and collection of revenue" discloses systems and methods that divide the billing function of a billing system from the provisioning function of a service in digital cable systems. Because the billing system is only responsible for billing, rather than the provisioning of services, new services may be added to cable systems without the task of configuring the billing system specifically for new services added to the system. The services are implemented using an offering package created by the service, where the offering package contains billing related information forwarded to the billing system to bill for the service.

United States Patent Application Publication No. 20030048380 to Tamura published Mar. 13, 2003 entitled "Self provisioning Set-Top Box" discloses a self provisioning television Set-Top Box. The STB has an interface that couples the STB to a service provider and incorporates a cable modem. A programmed processor boots from a boot ROM and carries out a process for self provisioning in the event the STB is new and not set up to use the current service provider. The process includes initiating communication with the service provider using the cable modem and sending equipment identifying information including a Set-Top Box serial number and a smart card identifier to the service provider. The service provider replies with system specific information including an application server identifier from the service provider. The STB then sends a user profile to the service provider, and the service provider replies by sending account information including an account identifier.

United States Patent Application Publication No. 20030069965 to Ma, et al. published Apr. 10, 2003 entitled "Provisioning per cable modem" discloses a method and apparatus for provisioning on a per cable modem level includes associating any customer provided equipment behind a gateway cable modem to the same internet service provider as the cable modem.

United States Patent Application Publication No. 20040260798 to Addington, et al. published Dec. 23, 2004 entitled "Systems and methods for distributing software for a host device in a cable system" discloses systems and methods that may be used for provisioning, configuring, and controlling a host embodied in a cable set top box or other digital device attached to a digital communication network, such as cable distribution network. A services system maintains various host files for various types of hosts that a cable subscriber may purchase and connect to the cable network. The Services Server interacts with the host using the host files. The host files may be downloaded from the host manufacturer into a database that distributes the modules as required to the various enhanced services systems. The host may be purchased by the cable subscriber and provisioning may be initiated by the retailer at the time of purchase using a provisioning network interacting with the appropriate cable system serving the subscriber.

United States Patent Application Publication No. 20050015810 to Gould, et al. published Jan. 20, 2005 entitled "System and method for managing provisioning parameters in a cable network" discloses a system and method for managing provisioning parameters in a cable network. A dynamic TFTP (DTFTP) server and a CMTS manage the provisioning of devices in a cable network. The DTFTP server and the CMTS share common provisioning parameters. A provisioning parameter has a name and a value. When changes are made in the value of a provisioning parameter that is also used by a CMTSs supported by that DTFTP server, the DTFTP server securely communicates the new provisioning parameter values to each such CMTS. In one embodiment, the DTFTP server pushes the new provisioning parameter values to the CMTSs. In another embodiment, a poller pulls the provisioning parameters from the DTFTP server to a central datastore where changes in provisioning parameters used by the CMTSs supported by the DTFTP are identified. The changed provisioning parameter values are pushed from the central datastore to the CMTSs.

Despite the foregoing, there is a need for improved apparatus and methods for provisioning network devices or CPE (such as for example DSTBs used in a cable or satellite network) that specifically is compatible and complementary to the operation of so-called "downloadable" conditional access, DRM or TD systems (e.g., a DCAS system). Such improved provisioning apparatus and methods would ideally include the ability to rapidly and seamlessly add new CPE/host devices to the operator's network, and configure them with the necessary firmware, etc. to enable operation with the "download" CA/DRM/TD environments previously described. Moreover, the network operator would also ideally be able to remotely provision the hosts if desired, and deactivate the hosts remotely as well.

Such improved provisioning apparatus and methods would also ideally be delivery-mode agnostic; i.e., they would be compatible with VOD, broadcast, broadcast-switched, and other content delivery paradigms, and would further allow for an interoperable architecture with components from different network, secure component, and CPE vendors, in effect standardizing many aspects of device provisioning, billing, and content control.

SUMMARY OF THE INVENTION

The present invention addresses the foregoing needs by disclosing apparatus and methods for provisioning CPE within a content-based network, as well as devices or domains associated therewith.

In a first aspect of the invention, a network apparatus is disclosed. In one embodiment, the apparatus is disposed substantially at a first location of a content-based network and adapted for provisioning of a security device at a second location of the network, and comprises: a provisioning subsystem comprising both cable modem and video provisioning apparatus. The exemplary provisioning apparatus is adapted to maintain identifying information of the security device, information regarding a topological context of the security device in the network, and the software configuration of the security device.

In one variant, the network apparatus further comprising a conditional access apparatus in communication with the provisioning subsystem; and an authentication apparatus in communication with at least the conditional access apparatus. The authentication and conditional access apparatus are configured to cooperate to transmit to the security device both: (i) at least one cryptographic key, and (ii) encrypted code configured to provide at least protection of content at the security device.

In another variant a personalization server (PS) apparatus in communication with the conditional access system is provided. The PS is adapted to select the at least one cryptographic key and encrypted code based at least in part on a communication received from the security device.

In a second embodiment, the network apparatus is disposed substantially at a first node of a content-based network and adapted for delivery of security information to a second node of the network, and comprises: a content provisioning apparatus; a security management apparatus in communication with the provisioning apparatus; and an authentication apparatus in communication with at least the security management apparatus. The provisioning, management, and authentication apparatus cooperate to: provision a client device coupled to the network; establish an account associated with the client device; authenticate a physically secure element of the client device; and provide at least one secure software image to the secure element, the at least one secure image enabling at least in part access to content distributed over the network.

In a third embodiment, the network apparatus is adapted for use with a client-side security management apparatus in operative communication with a content-based network, the client-side apparatus adapted to maintain at least a portion of a trusted domain within a client device using at least a secure element. The network apparatus comprises: a content provisioning apparatus; a conditional access apparatus in communication with the provisioning apparatus; and an authentication apparatus in communication with at least the conditional access apparatus. The authentication, provisioning and conditional access apparatus are configured to cooperate to transmit to the secure element of the client device both: (i) at least one cryptographic key, and (ii) encrypted code configured to provide at least protection of the content at the client device.

In a fourth embodiment, the network apparatus comprises: a provisioning system; a common image server; and a device-specific image server. The apparatus is adapted to securely obtain and deliver a device-specific software image, as well as a common software image, to at least a secure element of a target client device, the common image being applicable to all of a plurality of client devices having a common configuration and disposed within a network, and the device-specific image being specific to only the secure element of the target client device. Delivery of the device-specific image and the common image is conducted pursuant to the client device being provisioned within the network by the provisioning system.

In a fifth embodiment, the network apparatus is adapted for use in providing secure content and software downloads to a plurality of client devices within a cable television network, and comprises: secure download infrastructure adapted for data communication with a trusted authority (TA); a media provisioning system in data communication with the infrastructure; a billing system in data communication with the provisioning system; and a media security system in data communication with the provisioning system. In one variant, the secure download infrastructure and the TA cooperate to provide cryptographic elements and at least one secure client device software image for delivery by the infrastructure to the client devices. The provisioning system and the security system determine and apply entitlements for selected ones of the client devices in order to authorize providing the cryptographic elements and the at least one software image thereto.

In a second aspect of the invention, a method of delivering secure software over a network to a client device is disclosed. In one embodiment, the method comprises: entering information associated with the client device within at least one of a DNCS or billing system of the network; coupling the client device to the network; establishing a network address for the client device; providing via a first entity device credentials along with a cryptographic element for the client device to a second entity; returning a client device-specific personalized software image to the first entity from the second entity; returning a common software image to the first entity from the second entity; encrypting at least the device-specific image for the specific client device based at least in part on the cryptographic element; and sending via the first entity the encrypted device-specific image and the common image.

In a third aspect of the invention, a method of provisioning is disclosed. In one embodiment, the method is used for provisioning a client device for operation within a cable television network, the client device having a security device substantially unique to the client device, and the method comprises: acquiring a network address for the client device; placing an authentication entity in contact with the security device; authenticating the security device to the entity; obtaining personalization information associated with the security device based at least in part on the authenticating; providing the personalization information to the security device over the network; obtaining a software image common to all of a plurality of client devices having a common configuration and disposed within the network; and processing one or more messages at the client device in order to determine conditional access privileges.

In another embodiment, the method of provisioning is used for consumer premises equipment (CPE) comprising a conditional access (CA) download-enabled secure host, and modem and set-top box functionality. When the CPE is connected to a content-based network, the method comprises: enabling the modem functionality of the CPE; assigning a network address to the CPE; and providing the CPE with at least one image for the conditional access host chosen by an operator of the network. In one variant, the modem comprises a DOCSIS-compliant cable modem, and the network address comprises an IP address. The at least one image comprises at least a personalized image (PI) that is unique to the CPE.

In a fourth aspect of the invention, a method of doing business over a content-based network is disclosed. In one embodiment, the method comprises selectively configuring at least one network client device based at least in part on a service request from e.g., a subscriber associated with the at least one device. The selective configuration comprises: entering information associated with the at least one device into at least one of a billing system or digital network control system (DNCS) of the network; generating personalization data specific to the at least one client device when the at least one device is coupled into communication with the network; transmitting the data to the at least one client device; and establishing at least one security permission or policy within a secure element of the at least one client device, the at least one permission or policy enabling provision of the requested service.

In a fifth aspect of the invention, a client device adapted for provisioning according to a downloadable security/CA paradigm is disclosed. In one embodiment, the device comprises a modem and set-top box functionality, and further includes a secure microprocessor adapted to authenticate itself to an authentication entity after establishing communication via the modem.

In a sixth aspect of the invention, a method of deactivating a host of a client device is disclosed. In one embodiment, the network comprises an HFC cable television network having a video provisioning system, and the client device is not operable on the network (i.e., turned off, or not coupled to the network, etc.). In another embodiment, the client device is coupled and in communication with the head-end of the network.

In a seventh aspect of the invention, a method of doing business over a content-based network is disclosed. In one embodiment, the method comprises: migrating a client device having a first conditional access profile from a first location within said network to a second location within said network, said migrating comprising downloading a second conditional access profile to said device at said second location; and provisioning said device so as to allow for operation thereof within said network at said second location. In one variant, the provisioning comprises: entering information associated with said client device into at least one of a billing system or digital network control system (DNCS) of said network; performing at least one of generating or verifying personalization data specific to said client device when said device is coupled into communication with said network at said second location; and establishing at least one security permission or policy within a secure element of said client device, said at least one permission or policy enabling provision of a requested service.

These and other aspects of the invention shall become apparent when considered in light of the disclosure provided herein.

DETAILED DESCRIPTION OF THE INVENTION

Figure 1:
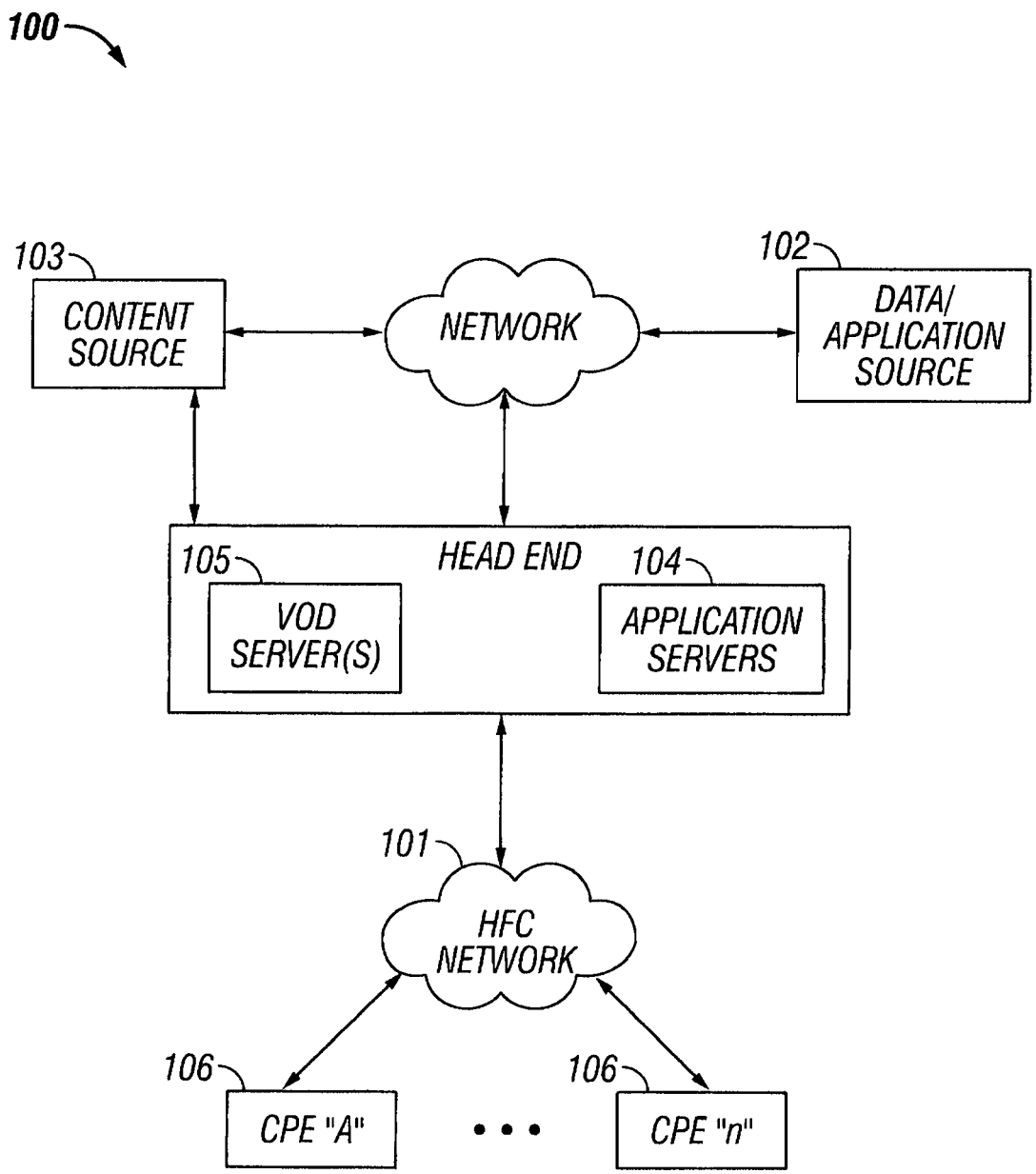
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "conditional access" refers to any access control scheme, whether implemented in hardware, software, or firmware (or combinations thereof), including without limitation members of the "Powerkey" family, NDS (including VideoGuard, mVideoGuard, etc.), DVB, and Motorola/General Instrument DigiCipher® family (DigiCipher II, MediaCipher, etc.). These can be implemented using, for example, CA-specific hardware/software elements embedded in the device, the so-called "CableCARD" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "personalization" refers generally and without limitation to data, cryptographic elements, and/or code downloaded or otherwise provided to a target device or domain (e.g., host) to create a desired security environment or policies for operation on or with a particular network system.

As used herein, the term "provisioning" refers to without limitation any process which enables, establishes, terminates, or modifies the configuration of a device, process, or entity or services related thereto.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/

FDMA, OFDM, PCS/DCS, analog cellular, CDPD, satellite systems, millimeter wave or microwave systems, acoustic, and infrared (i.e., IrDA).

Overview

In one salient aspect, the present invention comprises apparatus and methods for enhanced media provisioning capabilities. Media provisioning describes the process necessary to, inter alia, activate, configure, modify, and/or deactivate a CPE (e.g., downloadable conditional access (CA) system or "DCAS" host device) for operation within a content-based network. In one embodiment, this configuration of the host device (including one or more entities associated therewith, such as the secure microprocessor (SM) is remotely managed by a Media Provisioning System (MPS) component of the network operator's larger provisioning system.

A primary goal of the MPS and the downloadable CA infrastructure described herein is to provide a secure, distributed system for the management of SM firmware configuration within download-capable host devices ("DCAS hosts"). The exemplary MPS handles DCAS provisioning, and executes work flows to manage provisioning and configuration policy within the operator's network. The MPS signals these policies to an authentication agent or proxy (AP). The AP has responsibility for interacting with the CA System's personalization server (PS), an entity useful for the personalization of software/firmware images on individual host devices, and is also responsible for enforcing the aforementioned provisioning and configuration policies.

In the exemplary embodiment, the process for DCAS host provisioning requires the MPS to distribute information pertaining to the SM of each DCAS host device, activated within the network, to a corresponding authentication proxy (AP) within the network's conditional access infrastructure. This requires the MPS to maintain the topological context of each SM, the SM's identifying information, and the SM's operationally desired software configuration.

The provisioning apparatus and methods disclosed herein are useful at, inter alia, the head-end or distribution hub of a cable network, for implementing host device provisioning in the context of e.g., a download paradigm for legacy or newly developed CA, TD, and DRM software and cryptographic protection schemes. This allows the network operator, and even the third party content provider by proxy, to exert additional control on subscriptions and service provision, viewing, reproduction, and migration of content distributed over the network.

Benefits of the "download" approach associated with the provisioning techniques described herein include: (i) operation with both new and legacy CAS systems including DVB-CSA CAS proprietary systems; (ii) ability to be readily integrated with retail and OEM products; (iii) reduction of security costs associated with CAS implementation (i.e., by avoiding the capital expenditures and operating costs associated with purchasing, installing and maintaining Cable-CARDs or similar implementations); use of state-of-the-art security hardware and software, thereby enhancing protection of MSO and third party content provider investments; (v) centralized control of key generation and distribution by network operators (e.g., MSO's); and (vi) flexibility that allows for deployment of broadcast, VOD, TD, and DRM security solutions from multiple vendors.

Moreover, the secure download approach of the present invention allows for ready implementation of future security upgrades such as improved encryption algorithms and new CAS, TD, or DRM technologies.

Another primary feature of the secure provisioning and download architecture of the present invention is the creation of a system that is substantially consistent or symmetric with respect to both leased and retail client devices or CPE. Devices that are connected to the operator's network utilize a prescribed process to ensure that the client device's download "host" is registered with the operator's billing system, has the correct software and cryptographic elements (e.g., keying) for operation on that network, regardless of whether the device comprises a lease or retail installation. The exemplary processes described herein advantageously cause client device hosts with inappropriate or no such software or cryptographic elements to acquire these components from the network securely, after appropriate additions and configuration of billing and provisioning system components has occurred. This approach allows for substantial ubiquity for both leased and retail devices on the network, and at a competitive cost.

In the exemplary embodiment, the network portion of the architecture (disposed, e.g., the cable network head-end or BSA hub) comprises an authentication proxy (AP), conditional access (CA) system, and media provisioning system (MPS) particularly adapted for the aforementioned download paradigm. A personalization server (PS) is used in conjunction with the system to provide "personalization" to the client device(s), including providing the aforementioned software and cryptographic element (e.g., key) management download functions previously described. The MPS is part of the larger network broadband provisioning system (BPS), which is also in communication with the network operator's billing system (BS), the foregoing coordinating to provision the target host device while tracking and maintaining appropriate records and data within the operator's management and billing systems.

The exemplary embodiments of the apparatus and methods described herein also provide simultaneous support for multiple CA system instances and personalization servers within the same network topology. That is, a given SM host may have access to one or more CA systems via the provisioning system, which helps direct the host to the appropriate PS (CA system) based on one or more factors such as compatibility, host capability, service profile, and/or administrative and operational considerations. Policy enforcement (e.g., device revocation and state control of individual hosts) within the network is also provided, as is extensibility (e.g., downloading of CA, DRM and ASD clients).

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Lastly, while several aspects are described in the context of the Scientific Atlanta BOSS (Business Operations Support System) and associated messaging protocols of the type well known in the cable industry, these embodiments are merely exemplary, and the invention is in no way limited to such embodiments.

Network—

FIG. 1 illustrates a typical content-based network configuration with which the provisioning apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application, or other application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network entity.

Figure 1A:
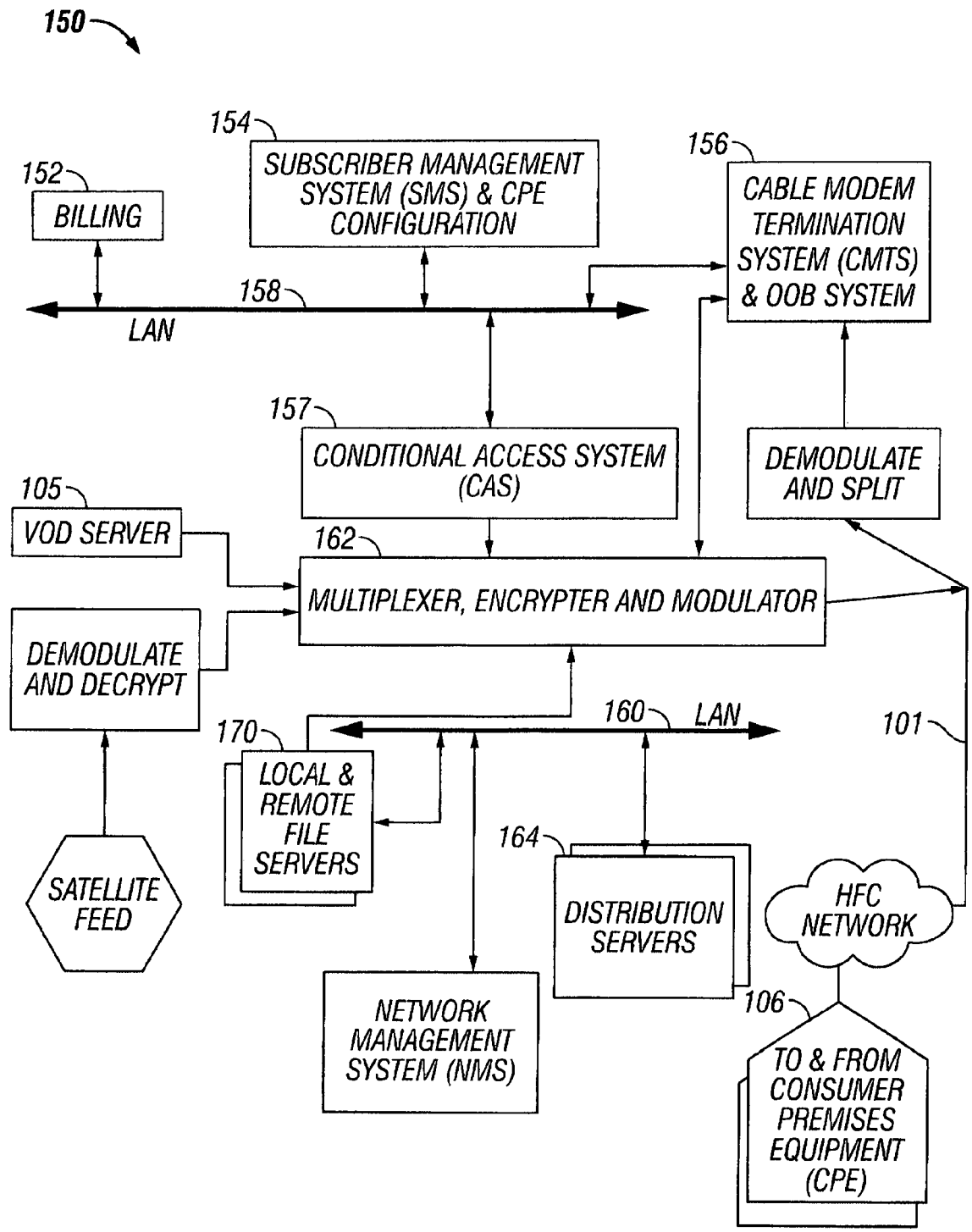
FIG. 1a is a functional block diagram illustrating one exemplary HFC cable network head-end configuration useful with the present invention.

Referring now to FIG. 1a, one exemplary embodiment of a generic network head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures (see, e.g., FIGS. 3e-3n and associated discussion presented subsequently herein).

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specifications provide for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
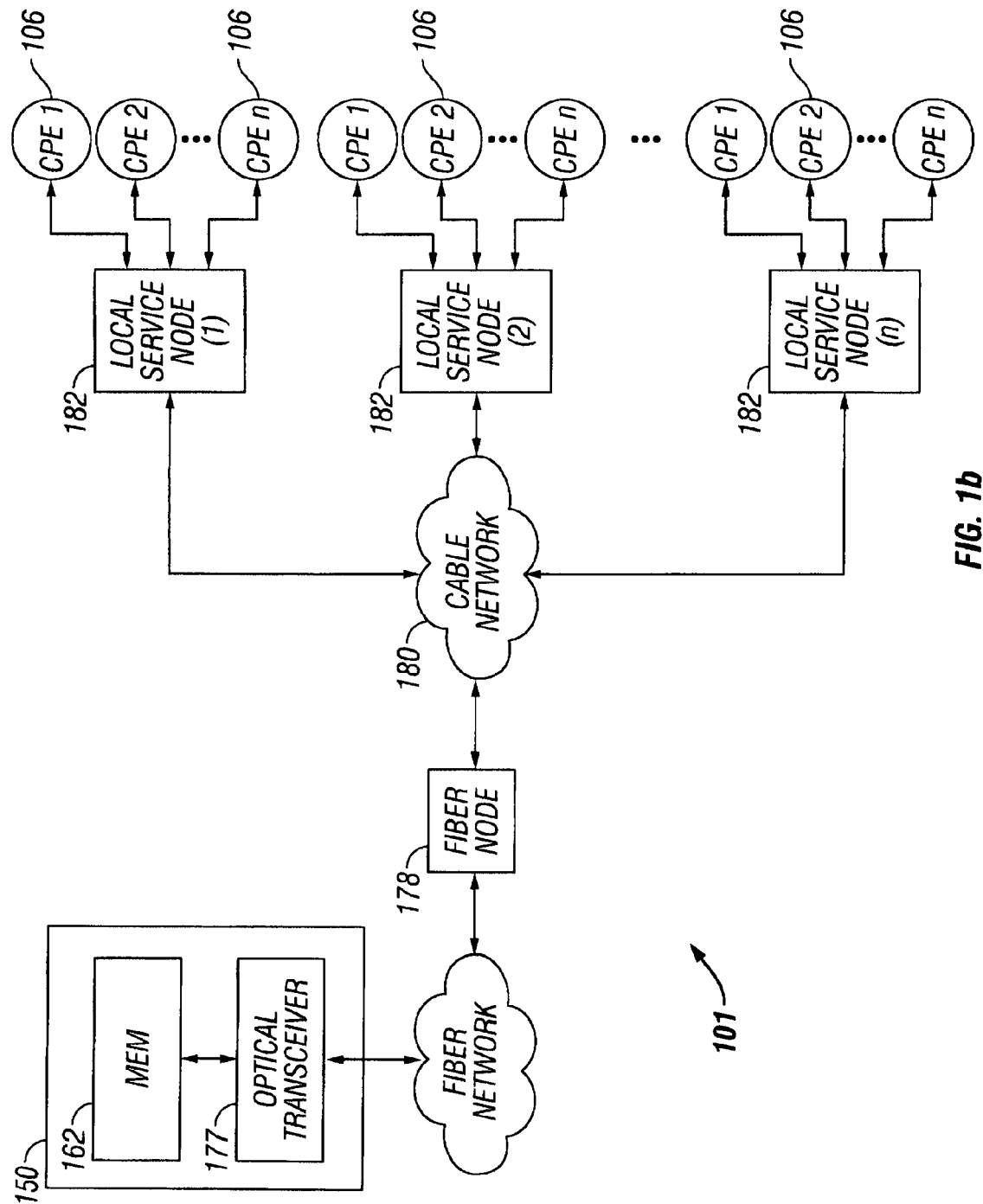
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
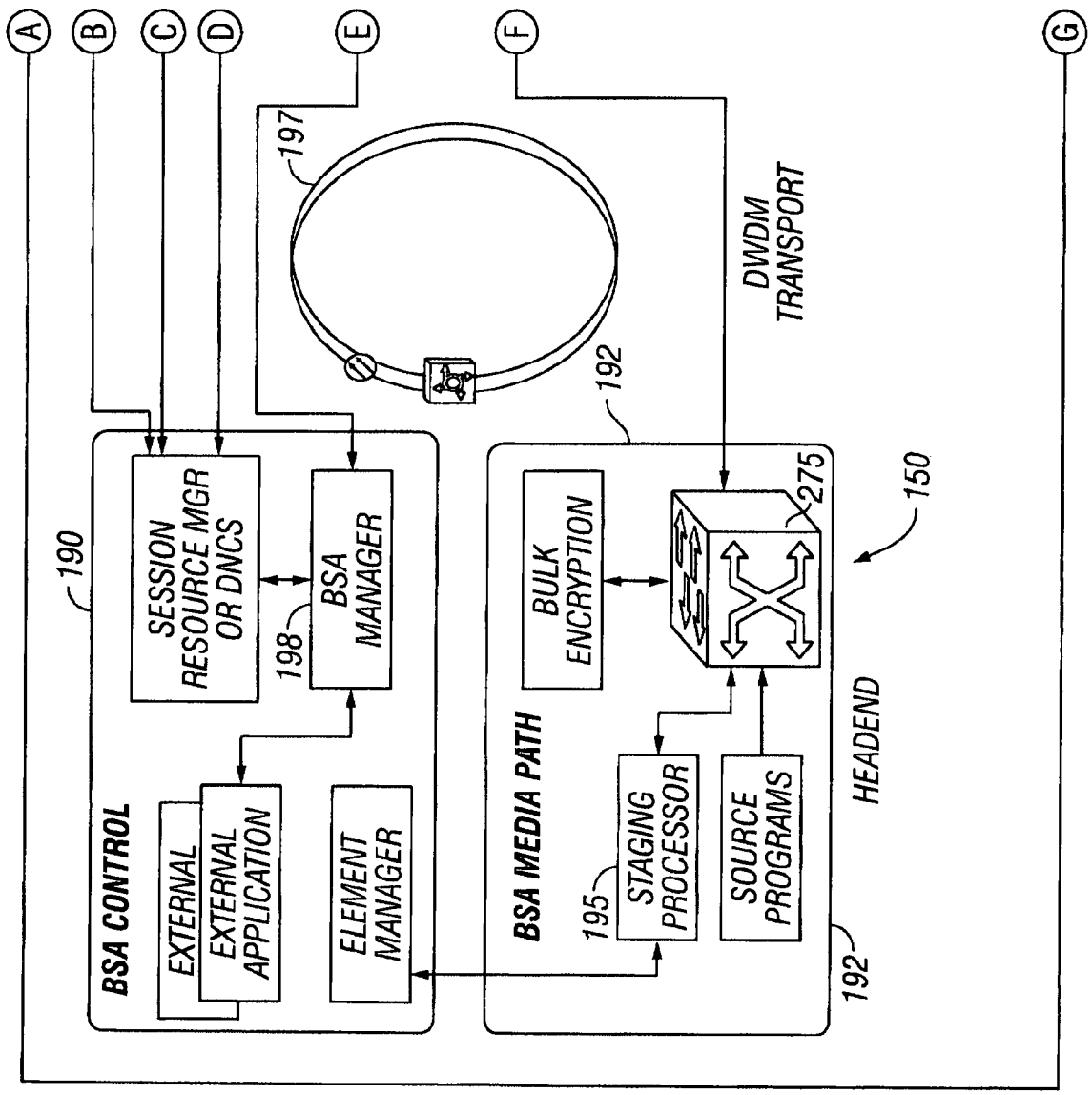
FIG. 1c is a functional block diagram illustrating one exemplary broadcast switched architecture (BSA) network useful with the present invention.
Figure 1C:
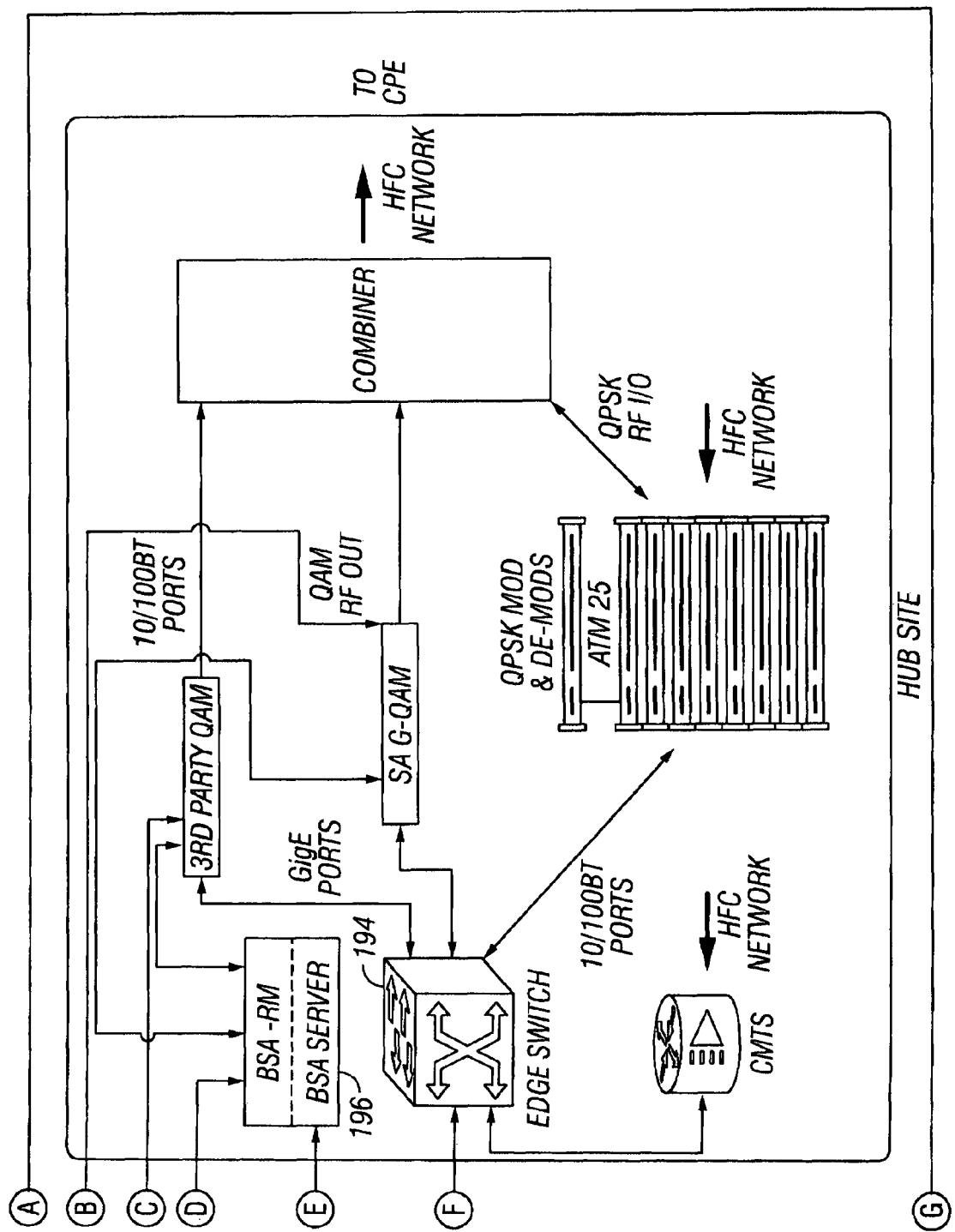

FIG. 1c illustrates an exemplary "switched" network architecture also useful with the provisioning apparatus and methods of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Network Security Download Apparatus and Methods—

Figure 2:
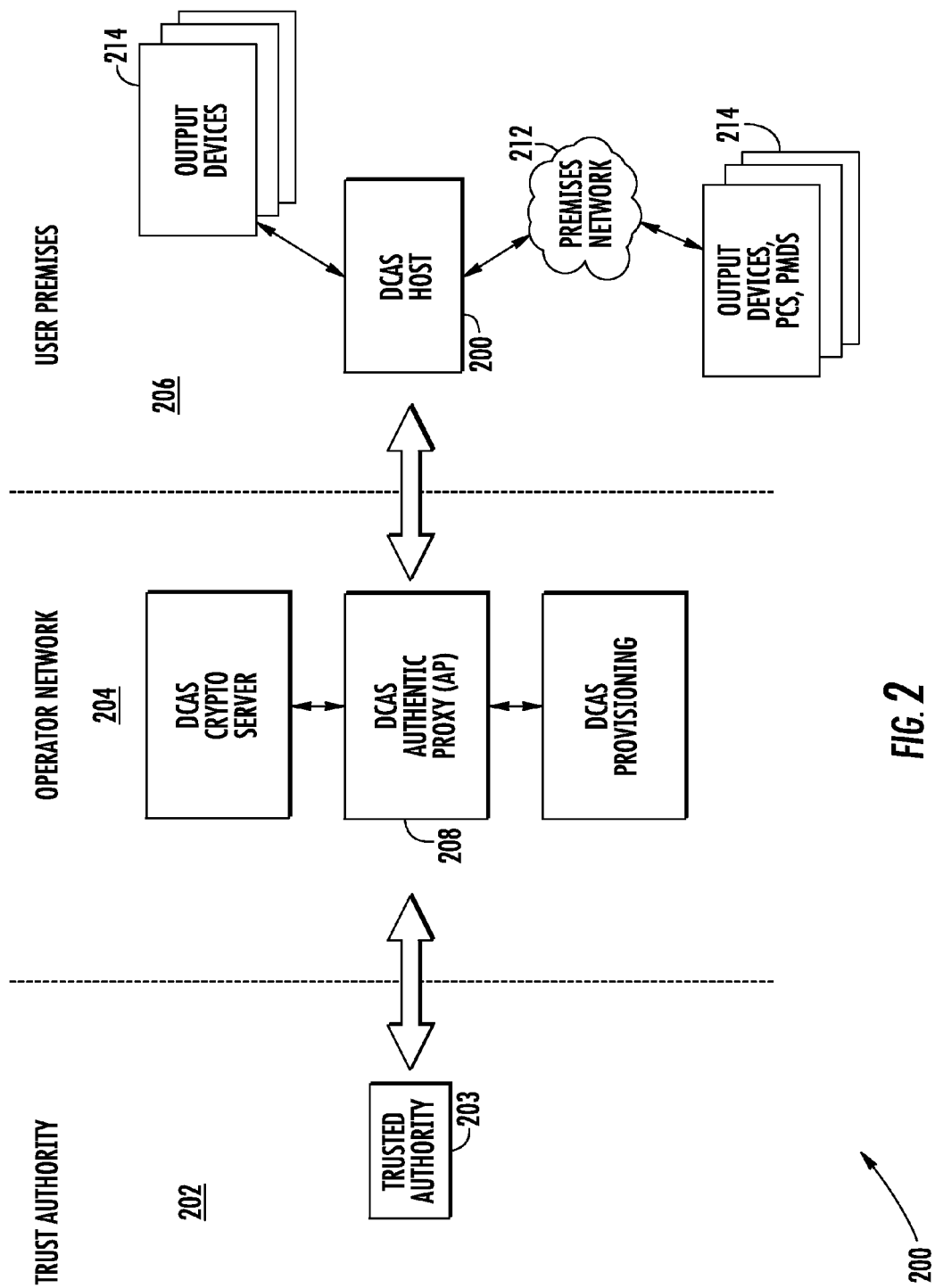
FIG. 2 is a graphical representation of a generalized security management architecture useful with the present invention, comprising trusted authority, operator network, and user domains.

Referring now to FIG. 2, a generalized model of the security download architecture useful with the provisioning apparatus and methods of the present invention is described. As used herein, the term "security architecture" is meant to encompass an environment adapted to accommodate at least: (i) CA requirements and policies; (ii) TD requirements and policies; and/or (iii) DRM requirements and policies. For the sake of illustration, exemplary embodiments of the architecture will be described primarily in terms of a conditional access (CA) security environment, although the principles described are readily adapted to DRM and TD applications as well.

Moreover, while many of the exemplary embodiments describe obtaining information from a head-end server, TA, or other such entity, the present invention also contemplates the use of other sources of such information including, without limitation, peer devices within or outside of the network, or intermediary nodes in the content distribution network.

As shown in FIG. 2, this generalized model 200 comprises three primary "realms"; i.e., (1) a trust authority realm 202; (2) a network operator realm 204; and (3) a user realm 206. Various entities within these realms are in communication with one another in order to effectuate the desired functions of the downloadable CA (e.g., "DCAS"), TD, and/or DRM environments.

Central to the security architecture is the concept of a "trusted domain" or TD. As previously described, such a "trusted domain" (TD) comprises an area (physically or virtually) within which programming or other content is protected from unauthorized access, distribution and copying. For example, in a cable network, a trusted domain may include not only the network portion where programming content traditionally is secured by, and within total control of, a cable operator (including, e.g., the head-end 150, HFC delivery network 101, etc.,) but also user devices or CPE 106 at subscribers' premises which are capable of receiving and securely storing programming content. Using the trusted domain approach, the network operator can guarantee certain subscriber access, distribution, and usage policy enforcement with respect to content held within the domain. For example, a digital representation of a movie held within an operator's TD (e.g., on a hard drive of a user device) cannot be distributed over the Internet, wireless network, etc. in viewable form, and cannot become a source for duplication of multiple viewable copies.

Exemplary apparatus and methods for implementing a "trusted domain" are described in co-owned and co-pending U.S. patent application Ser. No. 11/006,404 previously incorporated herein, although it will be appreciated that other approaches may be used with equal success consistent with the present invention.

In another variant of the invention the TD comprises a so-called "authorized service domain" or ASD. One exemplary embodiment of an authorized service domain useful with this variant is described in the document "DCAS Authorized Service Domain", Version 1.2, dated Nov. 30, 2005, which is incorporated herein by reference in its entirety. In this embodiment, the ASD comprises a domain where content is secured using the mechanisms available through the operator's conditional access system. For example, in a subscriber's home, the ASD physically translates into a collection of one or more trusted devices where content may be securely stored and moved within the domain. The distinction between the exemplary ASD and other forms of copy protection (e.g., DTCP) relates primarily to the fact that the content remains under operator control at all times. The control point within the ASD is the personalized secure microprocessor (SM). Hence, the ASD acts effectively as an extension of the operator's Conditional Access (CA) system.

It will be recognized that on the client side, the TD established within a target device (e.g., CPE 106) is not necessarily coextensive with the CPE 106 itself. For example, only certain portions of the CPE will be secure and suitable for maintaining the integrity of the protected content, and others (such as the analog output interface to a non-protected output domain or NSOD as described subsequently herein) not comprising part of the TD.

Referring again to FIG. 2, the trusted authority realm 202 generally comprises a Trusted Authority (TA) 203. The TA provides a secure keying and programming environment for selected client devices on the network. The Trusted Authority tracks and communicates keys and keying information for all authorized download system components.

The network operator realm 204 generally comprises an authentication proxy (AP) or agent 208, which communicates with the TA 203 in order to authenticate itself, and obtain the aforementioned keys and information that that is required to authenticate itself to the secure microprocessor (SM) described subsequently herein. The AP also communicates with the user realm 206 (e.g., with the secure download system (SDS) host 210 in the client device) in order to authenticate the client device (host) and download secure software images and cryptographic elements (e.g., keys) used in establishing the security domain and policies within the client device.

The user realm 206 comprises for example a user premises (e.g., residence or enterprise), including the user's host 210 and client device or CPE 106. Note that the SDS host 210 comprises a network security "entity" that may be coincident or separate from the physical implementation of the client device 106; the two may not be coextensive. For example, the host 210 may generically include the CPE 106 and any other devices that are compliant to the security download specifications and requirements.

The client device may take any number of forms, including for example a set-top box (e.g., DSTB), a converged device or "hive" such as that described in co-pending U.S. patent application Ser. No. 11/378,129 filed Mar. 16, 2006 entitled "Methods And Apparatus For Centralized Content And Data Delivery", incorporated herein by reference in its entirety, a wireless satellite receiver, or even a mobile wireless device in direct or indirect data communication with the operator network realm 204 and the AP 208. See, e.g., co-owned and co-pending U.S. patent application Ser. No. 11/258,229 entitled "Method And Apparatus For On-Demand Content Transmission And Control Over Networks" filed Oct. 24, 2005, incorporated herein by reference in its entirety, wherein media can be streamed between a mobile unit and user CPE 106, including optionally in an on-demand or session-based fashion. Accordingly, the present invention contemplates that the trusted domain and CA/DRM control can be exerted over several interconnected networks, including those outside of the MSO or user realm (e.g., a WSP or CSP network and radio area network (RAN) associated with the mobile device).

Similarly, so called "personal media devices" (PMDs) are contemplated to be used to form part of the trusted domain within the user realm. In one exemplary embodiment, the PMD comprises a video or other personal media device having multimedia capability, and which can include a secure microprocessor (SM) and other necessary components to authenticate to the CPE (acting as an AP proxy) or directly with the AP 208, and receive CA/DRM/TD client images as well as cryptographic elements such as secure microprocessor encryption or signing keys (SMEK and SMSK). For example, the PMD could act as either a) another DCAS device to which individual clients could be downloaded, or b) an acceptable trusted domain interface that allows TD content to be played on the player of the PMD.

In one variant, the user realm 206 of FIG. 2 comprises a residence. In addition to or in place of a traditional CAT-5 Ethernet twisted pair wiring configuration, the user's indigenous residence coaxial cabling, telephone wiring, or even low-frequency electrical wiring (e.g., HomePlug) may be used as a basis of forming a LAN within the residence. Similarly, the client device (or apparatus in communication therewith) may comprise a wireless interface or gateway, so that residence users are free to "roam" within or even outside the residence while maintaining connectivity to the MSO network. The secure or "trusted" domain established by the present invention within the user premises may also extend to devices which are not physically connected to the CPE 106 or other client device that is in direct communication with the AP. This underscores on salient advantage of the TD/ASD concept over prior art CA and similar network security systems; i.e., the ability to extend the domain within which the protected content may safely reside outside of the CPE 106 itself, thereby giving the user and network operator significant flexibility in providing new and enhanced services and features without jeopardizing content security.

It will be recognized that while the user realm 206 of FIG. 2 is illustrated as a generally fixed, single location, the user realm according to the present invention may in fact: (i) comprise multiple different physical locations, such as for example in the case of an enterprise, wherein the host device 210 acts as a gateway to a premises network 212 (e.g., corporate LAN, WAN, internet) serving multiple different locations or offices of that enterprise. Furthermore, these one or more locations need not be fixed, but rather may also vary as a function of time. For example, as previously described, the host 210 may act as a portal or gateway to a wireless network (e.g., WiFi, WiMax, etc.) that places the user(s), e.g., members of a given family in communication with the host 210 via their mobile wireless devices. A cable modem (e.g., DOCSIS) may also be used to provide internet connectivity to the premises (and hence the host 210), such that remote users/family members can access the host, and even devices connected thereto (such as DVRs, etc.) via their internet connection (at a remote site) and via the cable modem.

In another embodiment of the of the user realm, a personal video encoder (PVE) or comparable device is used as part of or is in communication with the DCAS host 210 (or an associated client device coupled thereto). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a TD-enabled Windows XP-based or similar PC via an IP network such as the Internet, and hence the user can view the data locally (i.e., at the same premises) or remotely so long as they have access to the IP distribution network. This functionality can be made part of a separate physical component within the user realm 206, or alternatively have some or all of its functionality disposed within the client device or CPE 106 itself. It may also be integrated with other devices (such as connected client devices or PMDs) as previously noted.

As can be appreciated, literally an unlimited number of network topologies (whether mobile, fixed, or both) may be used consistent with the aim of extending or configuring the trusted portion of the user realm 206.

The user realm 206 also typically will include one or more output devices 214, e.g., television monitors, personal computers, and the like. These devices will typically carry no security or protection mechanisms to protect content, and hence are not typically part of the "trusted domain", but rather a non-secure output domain (NSOD) as described in greater detail subsequently herein. These devices may, however, by physically integrated with a device that is part of the trusted domain, such as wherein a monitor is combined with a DVR, DSTB, or PC.

In the exemplary trusted domain architecture, content is secured using mechanisms specified and provided by the network operator. The TD can also be used to implement and manage selective control of output to one or more output domains (ODs). These ODs can be considered as being outside of the TD, yet which implement prescribed security policies or mechanisms. For example, one such OD may comprise a secure OD (SOD), wherein content delivered into the domain is protected using an authorized security mechanism that is outside of the network operator's direct control (in contrast to the TD, which is entirely with the operator's control). For example, the well known Digital Transmission Content Protection (DTCP) and High-Bandwidth Digital Content Protection (HDCP) copy protection schemes proffered by 5C and Intel Corporation, respectively. Literally any number of different DRM and copy protection techniques may be used (alone or in combination) consistent with the SOD of the present invention, however, including without limitation steganographics such as watermarking and encryption.

In the exemplary configuration, the network operator or designated third party proxy has the ability to specify policies to be implemented within the domain (e.g., copy one generation), via e.g., copy control information (CCI) or other such downstream communications to the host 210. Hence, while the operator can specify security policies to be enforced within the SOD, access to content once it is within the SOD is not dependent on the operator's TD or CA system, but rather on the security mechanisms enforced within the SOD. This is in effect an "indirect" form of control by the operator on the SOD, without directly imposing CA or other such policies enforced within the TD.

Aside from the SOD, other forms of output domains (OD) may be utilized consistent with the invention. For example, in one variant, a non-secure OD (NSOD) is utilized. The NSOD literally may carry no protections or guarantees of the security for the content. For example, content output via an unprotected digital or analog interface (e.g., analog video output to a monitor or recording device) would be within the NSOD. Similarly, digital data transmitted "in the clear" would be entering an NSOD.

Figure 3:
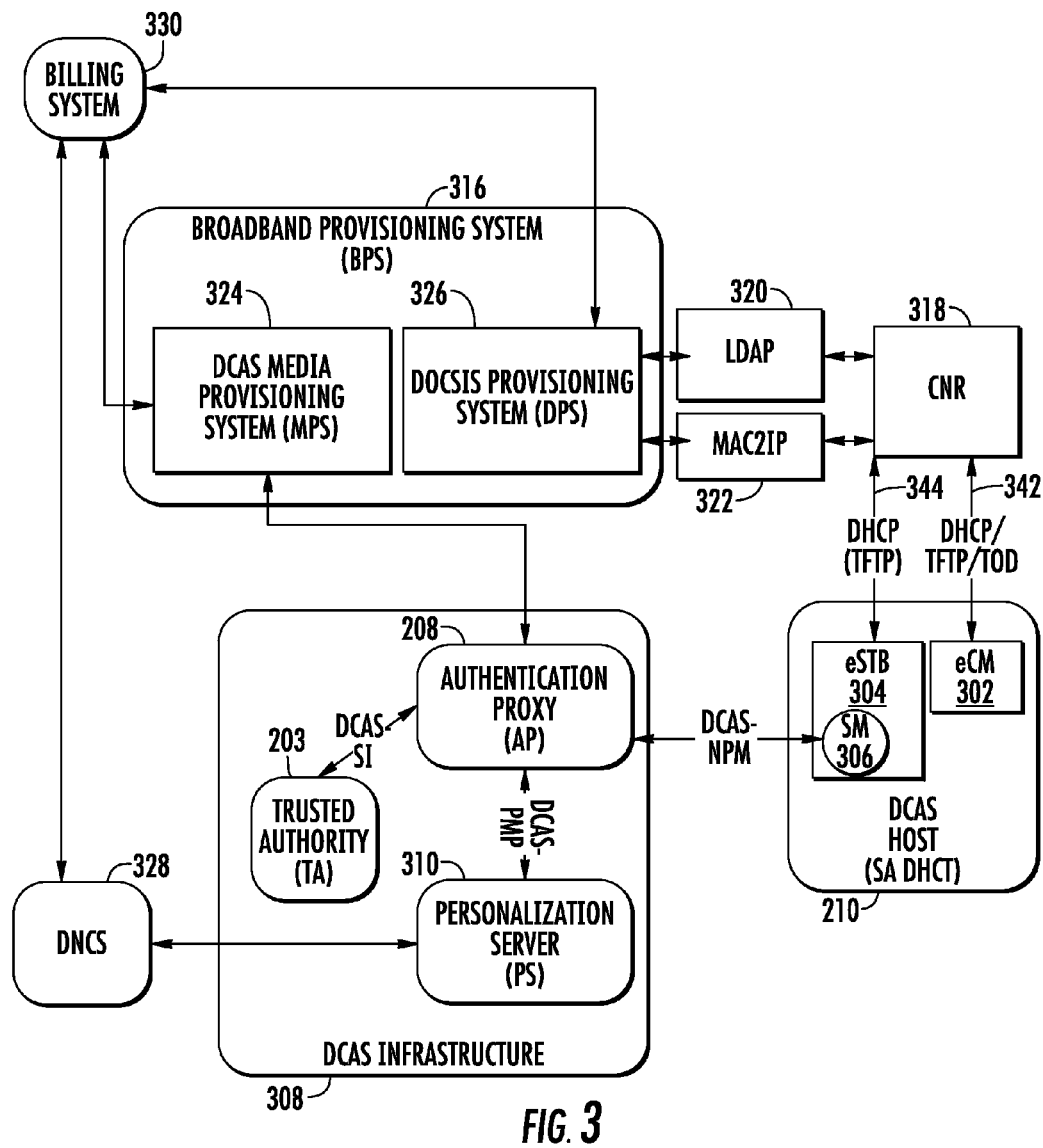
FIG. 3 is an architectural block diagram of a cable network implementing a downloadable security architecture (e.g., Conditional Access system (DCAS)), in accordance with one embodiment of the present invention.

FIG. 3 shows a specific implementation of an exemplary "downloadable" (e.g., DCAS) network architecture according to the invention. A DCAS host or client device 210 is connected to the network, such as in the form of a DSTB CPE 106. The DCAS host device shown in this example includes embedded cable modem functionality (eCM) 302 and embedded set-top box (eSTB) 304 functionality. The eSTB functionality includes a secure microprocessor (SM) 306 that is implemented in accordance with security concepts previously described.

The DCAS host device 210 is communicatively coupled with the DCAS infrastructure 308 typically deployed by the network operator. The DCAS infrastructure includes, for example, a Personalization Server (PS) 310 that provides a particular Conditional Access (CA) System's interface to the DCAS Infrastructure and is responsible for the assignment of a personalized SM client image to each SM, an Authentication Proxy (AP) 208 that provides the communications path between the SMs deployed in the network, the personalization server(s) 310, and the DCAS Video Provisioning System (MPS) and a TA server 203 that maintains the set of root keys that provide a root of trust for the DCAS system. The TA authorizes the assignment of keys to other parties in the DCAS infrastructure. The SM 306 may communicate with the AP 208 using a protocol such as the DCAS NPM protocol, described in inter alia, "DCAS Protocol and Messaging Specification", Time Warner Cable Spec-DCAS-NPM-W10.01, Oct. 31, 2005, which is incorporated herein by reference in its entirety.

The DCAS Host device 300 is also communicatively coupled with a Broadband Provisioning System (BPS) 316 through intermediate network functional elements such as e.g., a Cisco Network Registrar (CNR) 318 and servers performing functions such as the Lightweight Directory Access Protocol (LDAP) 320 and Media Access Control to Internet Protocol (MAC2IP) 322. The BPS functions include a DCAS media provisioning system (MPS) 324 and a DOCSIS provisioning system (DPS) 326. Additional elements of the exemplary DCAS network include a billing system (BS) 330 and a Digital Network Controller System (DNCS) 328. In the illustrated embodiment, the BS 330 is communicatively coupled with the DNCS, MPS and DPS, and the DNCS is communicatively coupled to the PS 310. The MPS is also able to at least monitor the messages between the BS and the DNCS.

The process for provisioning in the exemplary security architecture (e.g., DCAS) requires the MPS 324 to distribute information pertaining to the SM of each host 210 to be activated within the network to a corresponding AP 208 within the DCAS infrastructure. This requires the MPS to maintain the topological context of each SM 306, the SM's identifying information, and the SM's operationally desired software configuration. Therefore, MPS 324 should manage information elements such as those described below:

(1) SM Identifier Information—Unique SM information referenced by the Secure Micro Identifier (SMIdentifier), the corresponding Transport Processor Identifier (TPIdentifier), and the corresponding Host Hardware Identifier such as eSTB MAC Address.

(2) SM Topology Information—The location and association of a Secure Micro Identifier to the correct Authentication Proxy IP Address and the identification of the correct Personalization Server Identifier (PSIdentifier) and Personalization Server IP Address corresponding to the PS which will serve the SM. In one implementation, this may be achieved via a lookup table which maps DNCS to PS (PSID & PS IP Address) to AP (APID & AP IP Address). Using this table, the MPS 324 can determine to which AP it needs to send a particular message. Other mechanisms for entity/process association well known to those of ordinary skill in the networking arts may also be substituted with equal success.

(3) SM Client Software Information—The SM Client IDs to be assigned to a given SM Class ID and a given Secure Micro Identifier. These enable the AP 208 to manage the process of SM Client downloads to the SM 306, further described in the present invention. The MPS 324 may for example implement the client IDs as a single, static set of SM Client IDs to be assigned to all deployed SMs. Another way to implement client IDs is to provide for an interface by which specific SM Client IDs are assigned to specific SM Class IDs ("coarse grain" grouping), or such as where specific SM Client IDs are assigned to specific Secure Micro Identifiers or Host Hardware Identifiers within a given SM Class (fine grain grouping). Table 5 shows exemplary parameters stored (on a per-SM 306) by the MPS 324 of the illustrated embodiment.

Figure 4:
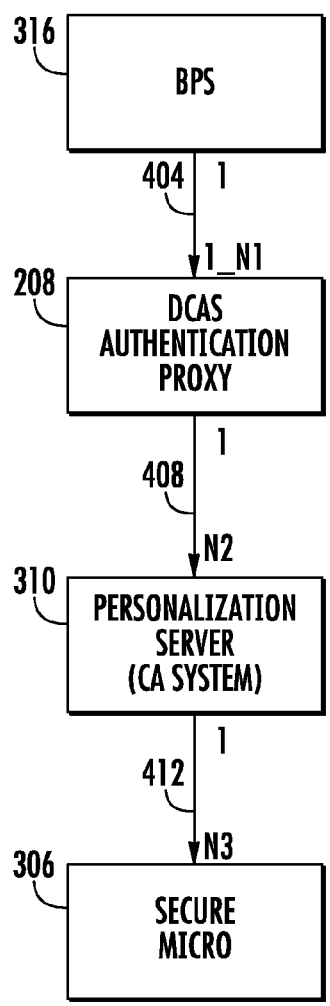
FIG. 4 is a functional block diagram showing the connectivity relationship among various elements of a multi-region cable network, in accordance with an embodiment of the present invention.

FIG. 4 illustrates an exemplary relationship between various DCAS provisioning and infrastructure components in a deployment where multiple servers and CA systems are used. A typical network deployment will include one BPS 316, to which NJ DCAS AP's 208 are coupled, as shown by connector 404, where NJ is an integer greater than or equal to 1. Similarly, N2 CA Systems 310 are coupled to each AP 208, as shown by connector 408, where N2 is an integer greater than or equal to 1. Finally, N3 SM's 306, located within or associated with hosts 210, are coupled to each Personalization Server 310, where N3 is an integer greater than or equal to 1.

When a new host device 210 is about to be added to a network, the operator first prepares the device. The preparation phase includes adding identification information of the host device to various network components such as the BS. This may be done automatically (e.g., upon detection of the device being connected or otherwise placed in communication with the network, akin to well known "auto-configuration" functionality used in many data networks), semi-automatically (e.g., automatically after initiation or confirmation by an operator), or even manually as desired. Preparation of the host may also occur (at least in part) before the device is ever connected to the target network; e.g., during manufacturing, in a pre-delivery phase, and so forth.

Figure 5A:
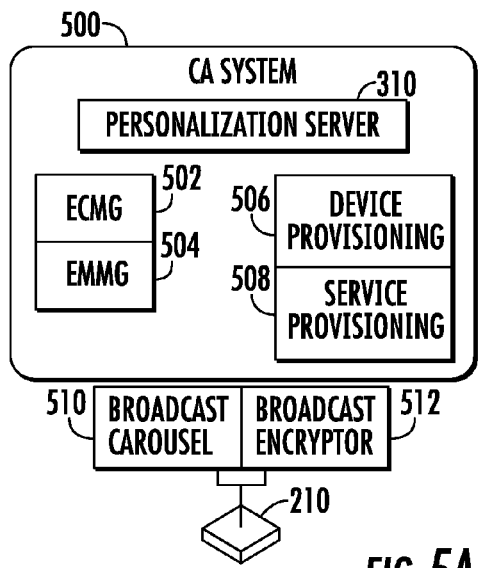
FIG. 5a is a block diagram of an exemplary Conditional Access (CA) system generally useful with the present invention.

FIG. 5*a* shows a functional block diagram of an exemplary conditional access (CA) system 500 deployed in a cable network showing architectural blocks useful in describing the present invention. The CA System is in communication with multiple host devices 210 over a hybrid fiber coaxial (HFC) network. The exemplary CA System comprises a Personalization Server 310, an Entitlement Control Message Generator function (ECMG) 502, an Entitlement Management Message Generator function (EMMG) 504, a Device Provisioning function 506 and a Service Provisioning function 508. It will be appreciated that while the ECMG and EMMG protocols are shown in conjunction with the illustrated embodiment, other control and/or messaging protocols may be used with equal success.

Figure 5B:
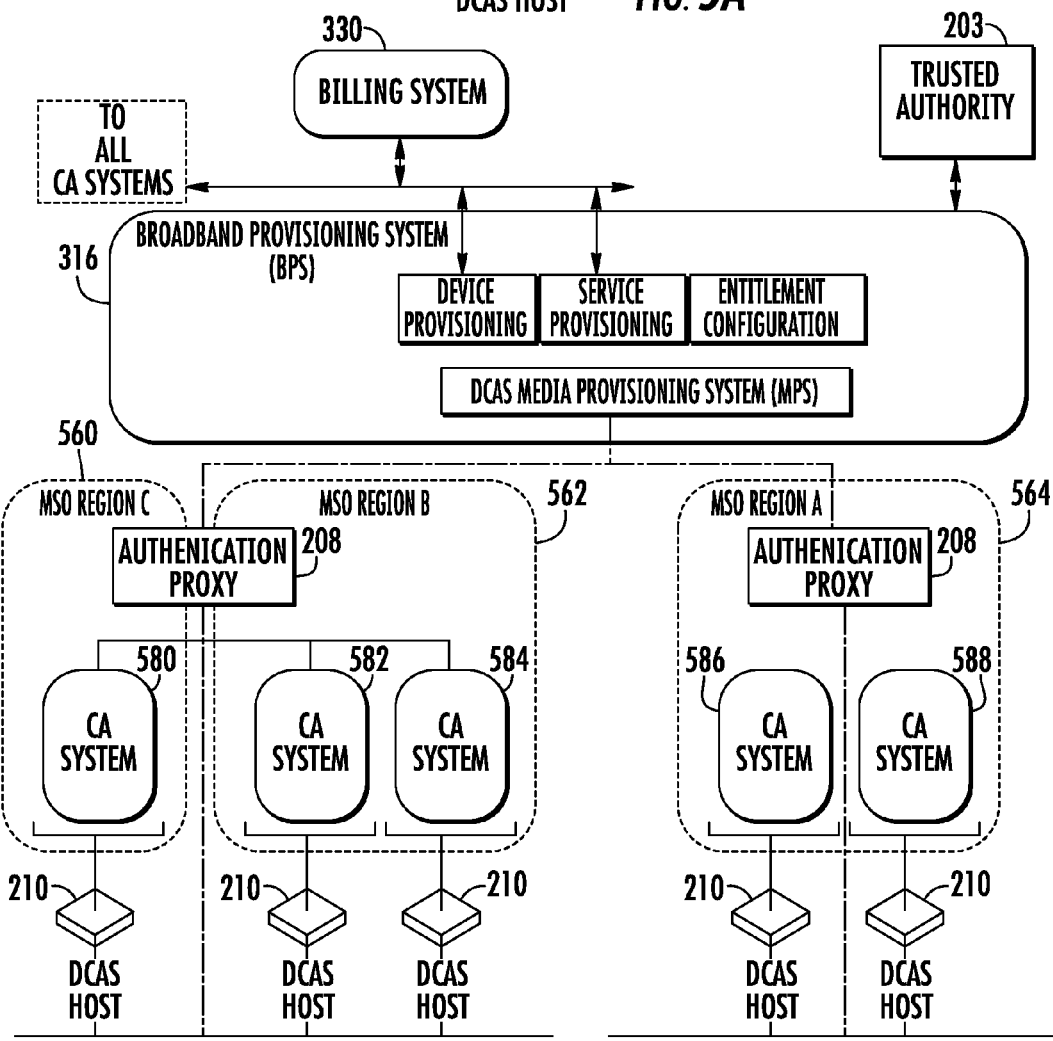
FIG. 5b is a functional block diagram of an exemplary multi-region cable network generally useful with the present invention.

FIG. 5*b* shows exemplary multi-region deployment in a multiple-system operator (MSO) network that includes a BPS and multiple CA Systems. The Figure shows three MSO network regions: (i) MSO Region A 564, that includes two CA systems 586, 588; (ii) MSO region B 562, that includes two different CA systems 582, 584; and (iii) MSO Region C 560, that has only one CA System 580 deployed in the region. The individual CA systems may come from different vendors and have different configurations. As shown in FIG. 5*b*, the CA systems within Regions B and C are controlled by the same Authentication Proxy server 208, and a single Authentication Proxy is used with the CA systems of MSO Region A. Both Authentication Proxy servers 570 and 572 are in turn coupled to the MPS 324 within the BPS 316.

Figure 6:
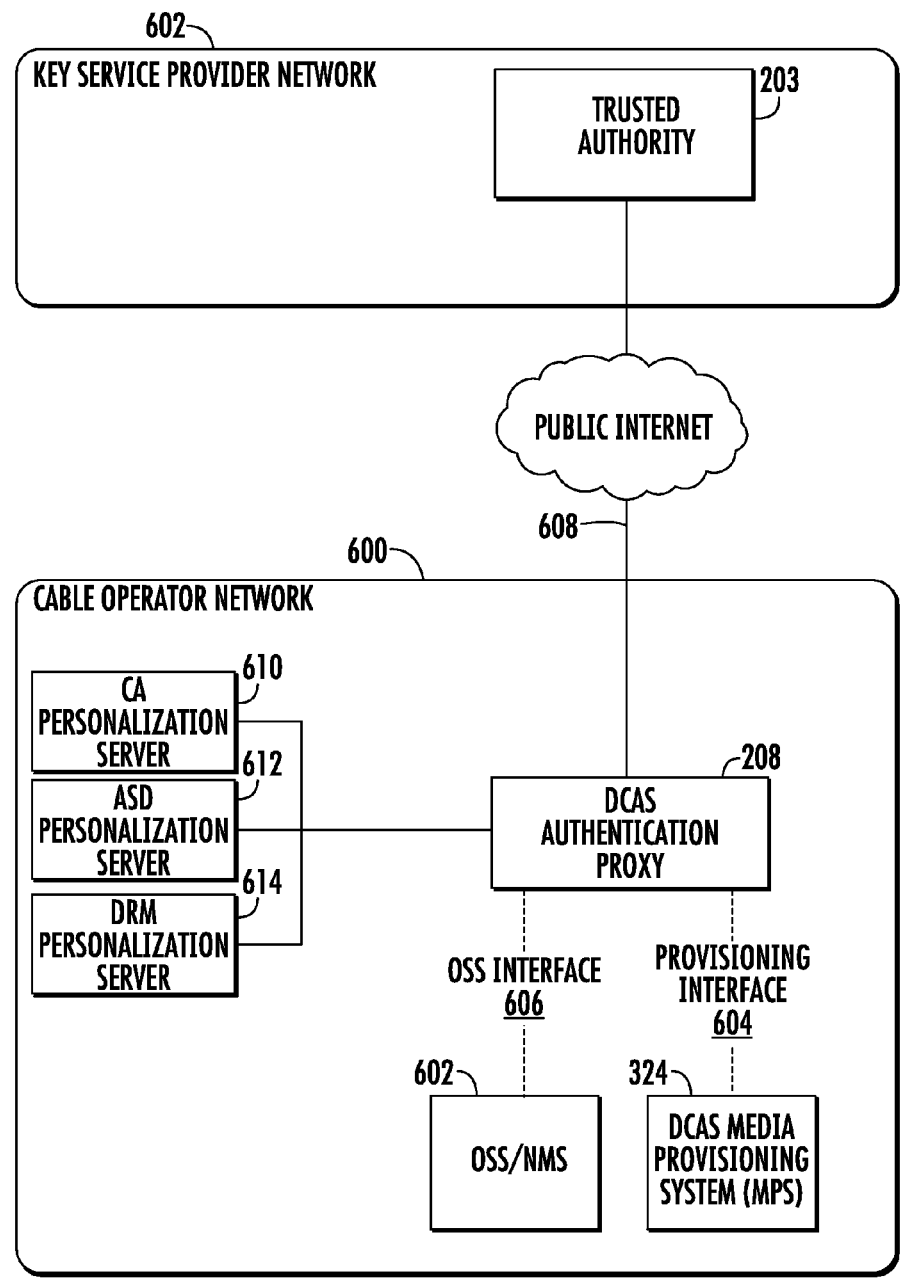
FIG. 6 is a functional block showing connectivity between a cable network and a Key Service Provider network.

FIG. 6 shows exemplary interfaces across which various messages further described in the present invention are communicated. A TA 203 within a Key Service Provider's Network 602 is connected to an AP server 208 within a cable operator network 600 over a link 608 via the public internet (which may comprise, e.g., the Internet, or another untrusted network). For security reasons, the link can implement a secure protocol for communications, such as for example a VPN tunnel of the type well known in the networking arts, and/or a physically secure network. The AP 208 is in turn coupled with other personalization servers in the network 600 such as a CA personalization server 610, an ASD personalization server 612 and a DRM personalization server 614. For security reasons, the links between the AP and each personalization server (PS) can also be implemented using a secure protocol (and/or a physically secure network if desired). The AP is further connected to other network elements such as the MPS 324 using a Provisioning Interface 604 further described subsequently herein, and an Operation Support System (OSS) or Network Management System (NMS) server 602 over an interface 606 implementing any of the available OSS interface or comparable protocols.

In another variant of the invention, the billing system (or multiple systems as applicable) sends a copy of the messages it forwards to the DNC to the Media Provisioning System (MPS) 324. The billing system(s) is/are configured to filter and send messages for "DCAS only" type of devices, thereby allowing for inter alia, differentiation within the system between download-enabled and non-download enabled devices.

Provisioning Flow—

Figure 7:
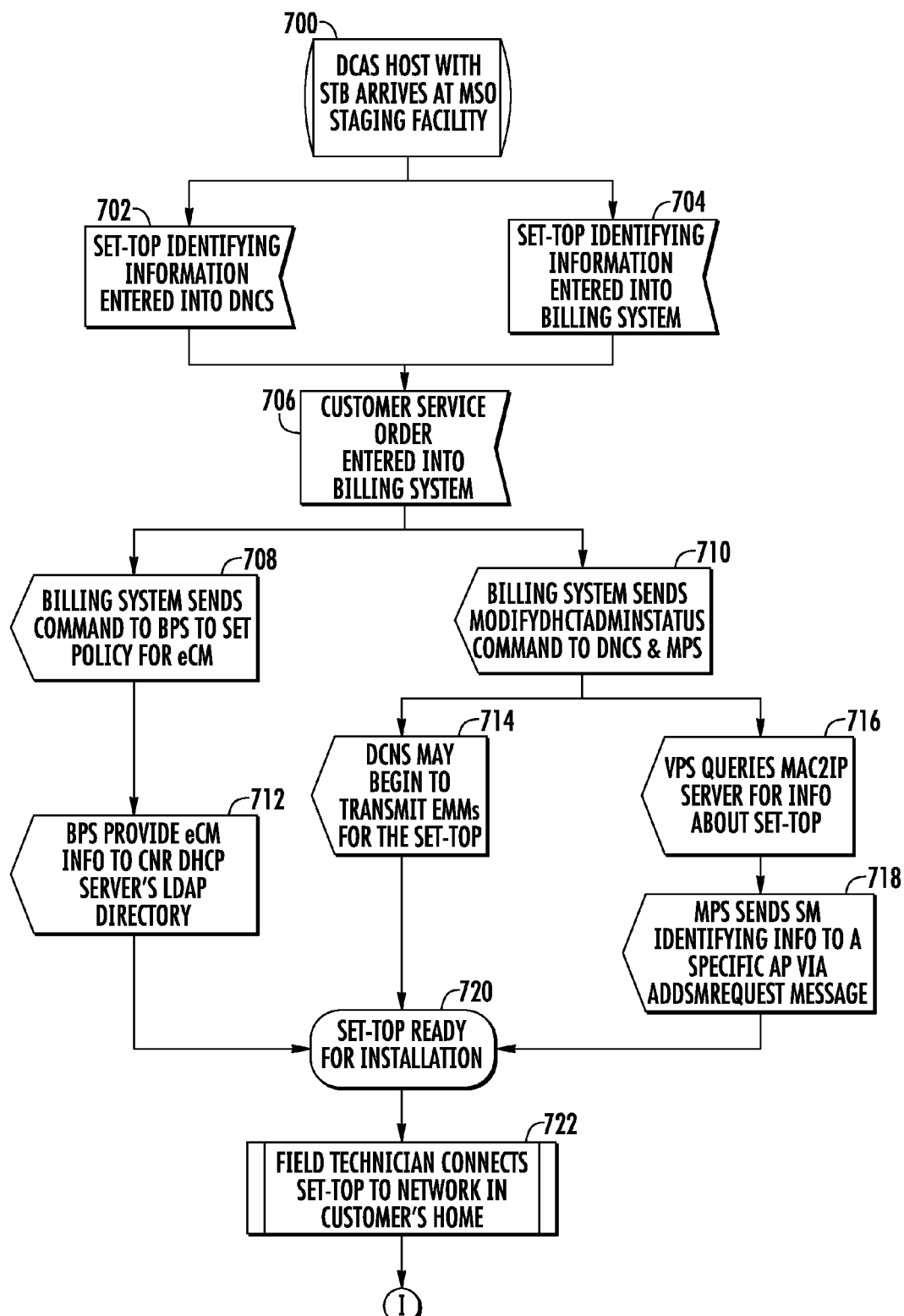
FIG. 7 is a logical flowchart showing one exemplary methodology of provisioning a new host device in a network, in accordance with one embodiment of the invention.

FIG. 7 is a flowchart illustrating the steps implemented in provisioning a host device in a network according to one exemplary embodiment of the present invention.

First, a DCAS host 210 with embedded STB function arrives at an MSO facility or other designated location in step 700. In the next step 702, an entity (e.g., a Customer Service Representative (CSR) or an automated process) enters information that uniquely identifies the STB function of the DCAS host 210 in the DNCS system of the network. Such information may include for example one or more of unique Media Access Control (MAC) address, Ethernet hardware address, TUNER_ID, TUNER_USE, serial number, alphanumeric identifier or any other identification techniques used to uniquely identify an STB. In addition to this, in step 704, the information that uniquely identifies the STB is also entered in the billing system (BS) 330 or other such MSO tracking entity.

In step 706, a CSR or automated entity enters the customer service order for deploying a DCAS host device in the BS. This information may include e.g., pairing-up the eCM and eSTB MAC addresses with a customer billing account and desired service levels, and/or features that may be specific to that device. The CSR then may assign the host device 210 to a technician for field installation. In the next step 708, the BS 330 sends a command to the BPS 318 to set a policy for the eCM function of the target host device 210. When the BPS receives the information from the BS (step 712), the BPS provides information about the eCM of the host device being installed to the DHCP server's LDAP directory. Per step 710, the BS sends a Scientific Atlanta BOSS ModifyDhctAdminStatus command to the DNCS 328 and MPS 324. This command indicates to the DNCS and MPS that host device is about to be put in service within the network.

After receiving the ModifyDhctAdminStatus command, the DNCS can begin transmitting EMMs to the host device per step 714. Moreover, in one variant, the Entitlement Management Messages (EMMs) are used to specify which host/CPE within the network ("targeted populations") are subsequently given access to content per step 650. A targeted population may comprise as few as one specific CPE, or as large as all CPE within the network. EMMs may also be issued to a group of CPE based on one or more targeting criteria which may include, without limitation, specific TUNER_ID, MAC or other CPE-specific variables, geographic profiles (e.g., all CPE within a given geographic region, zip code, etc.), demographic profiles, equipment type profiles, subscriber level profiles, CA and DRM capabilities, and so forth. Exemplary methods and apparatus for targeting selected subsets or populations with a network are described in, e.g., co-pending and co-owned U.S. patent application Ser. No. 11/186,452 entitled "Method And Apparatus For Boundary-Based Network Operation" filed Jul. 20, 2005 which is incorporated herein by reference in its entirety, although other approaches may be used with equal success.

After receiving the ModifyDhctAdminStatus command per step 710, the MPS queries in step 716 the Mac2IP server 322 for information about the STB of the Host device being deployed. In the next step 718, the MPS sends an AddSmRequest message to a selected AP. Table I shows exemplary parameters included in the AddSmRequest message, although it will be recognized that other message types and formats can be used with equal success. Table 5 provided below describes an exemplary format of implementation of these parameters.

In step 718, MPS identifies the SM within the host device 210 that is being installed to the AP. When steps 712, 718 and 720 are complete, the host device is ready for installation by e.g., a field technician. Next, in step 722, a field technician installs the host device in a customer premise and connects it to the network.

TABLE 1

| Parameter |
|---|
| HostHardwareIdentifier |
| HostIpAddress |
| PSIdentifier |
| PSIpAddress |
| SMClassIdentifier |
| SMClientIdentifier1 |
| SMClientIdentifier2 |
| SMClientIdentifierN |
| SMIdentifier |
| TPIdentifier |

Figure 7A:
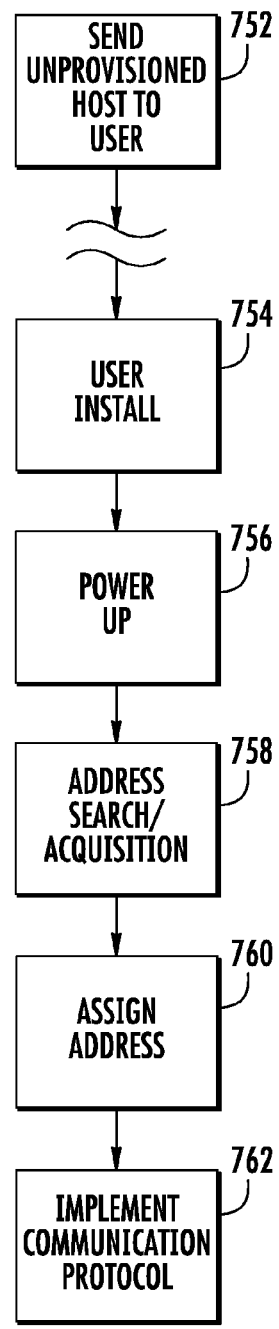
FIG. 7a is a logical flowchart illustrating an alternate embodiment of the host device provisioning methodology embodiment of the present invention.

It will be appreciated that while described in the context of a pre-installation provisioning methodology with respect to FIG. 7, the host device(s) may alternatively be provisioned wholly or partly after installation. Moreover, the provisioning may be done after a self-installation process performed by, e.g., the end user. For example, in one alternate embodiment (FIG. 7a), the unprovisioned host device 210 is sent directly from a manufacturer or retailer to a target subscriber of the MSO (e.g., upon request to commence service) per step 752. The subscriber is given explicit instructions with the device (akin to a DSL home installation kit well known in the prior art). The subscriber connects the device to their installed coaxial cable (a service technician may be required in order to place the coaxial cabling of the residence in communication with the MSO network local node) per step 754. After connection, the subscriber is directed to power up the device (step 756), and the device initiates the address acquisition process (step 758). For example, a DHCP server or other entity (which may be discovered via, e.g., a DCHP broadcast "discover" message or other such mechanism) can be used to allocate an IP address to the subscriber device (step 760).

Alternatively, using an auto-configuration (e.g., "zero-config") process of the type well known in the art, the device may search the network to determine used and unused addresses. The device then grabs an available MAC or other network address according to prescribed protocol (e.g., take address if available starting from XXXXYYYY, etc.). This address in one case is temporary and will be used by the device 210 for the remainder of the provisioning process only; a new permanent address is assigned by the head-end 150 during the provisioning process (or once completed). Alternatively, the "grabbed" address may be used permanently by the device 210 if desired.

Network address management techniques are well known in the art, and accordingly not described further herein. It will be appreciated by those of ordinary skill that the foregoing embodiment are merely exemplary; literally any method of assigning an address to a device (whether permanent or temporary) may be used consistent with the invention.

Once the address has been obtained by the host device 210, it can then implement a communication protocol per step 762 to initiate communication with a head-end or other network entity (e.g., MPS 324) adapted to provision the device remotely. This protocol can be implemented in stages; e.g., (i) first establishing communication with the head-end entity, irrespective of authentication; (ii)) second, authenticating the host device 210 and head-end entity to one another (thereby preventing man-in-the-middle and spoofing attacks); and (iii) negotiating and delivering necessary data and information to complete the provisioning process. This latter process (and in fact even the former ones) can also be conducted with assistance/input from the subscriber, such as e.g., a password, authentication code, order number, etc. given by the MSO via another communication channel, which the user may be prompted to enter into the host device 210 or provide via another mechanism (such as telephonic channel, Internet website, etc.).

Figure 8A:
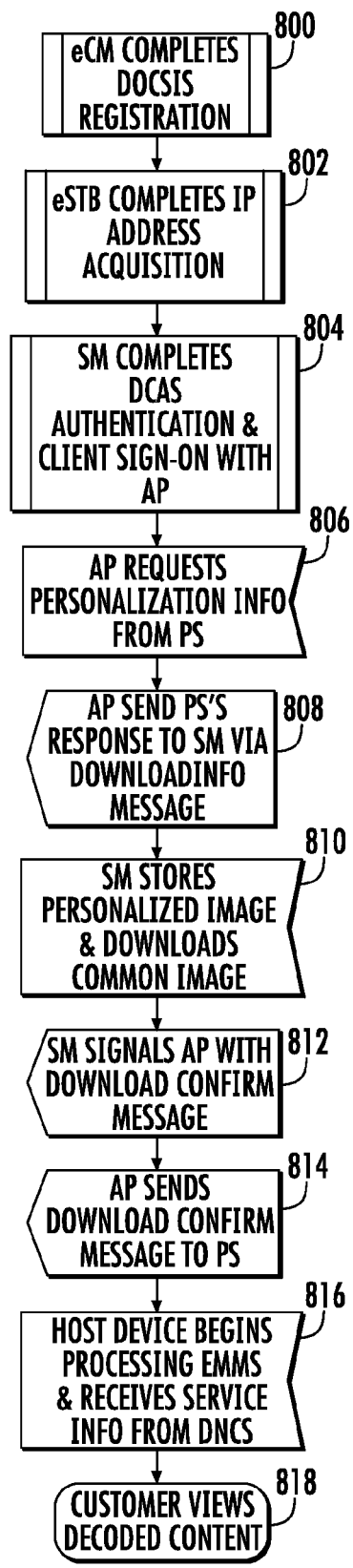
FIG. 8a is a logical flowchart showing a second set of steps of provisioning a new host device in accordance with one embodiment of the invention.

Referring back to the provisioning methodology of FIG. 7, one exemplary method performed once the host device 210 is connected to the network (step 722 of FIG. 7) is shown in FIG. 8a. Specifically, the eCM 302 within the host device completes its DOCSIS registration per step 800. Following that, in step 802, the eSTB 304 acquires an IP address. Per step 804, the secure micro (SM) in the host device completes its DCAS authentication and sign-on with the AP. In the next step 806, the AP 208 requests personalization information for the PS 310. In step 808, when the AP 208 receives the personalization information from the PS 310, it then sends the information to the SM 306. The SM 306 stores the personalized information received from the AP in the form of a Personalized Image and downloads a Common Image from a TFTP or carousel server (or even the AP 208 in an alternate embodiment) per step 810. Upon completion of step 810, the SM 306 sends a confirmation message in step 812 to the AP 208. In step 814, the AP relays this message to the PS 310. The host device 210 300 begins processing EMMs received from its CA system and also begins processing service information from the DNCS 328 per step 816. After successful completion of this processing, the customer can begin viewing decoded content per step 818.

Figure 8B:
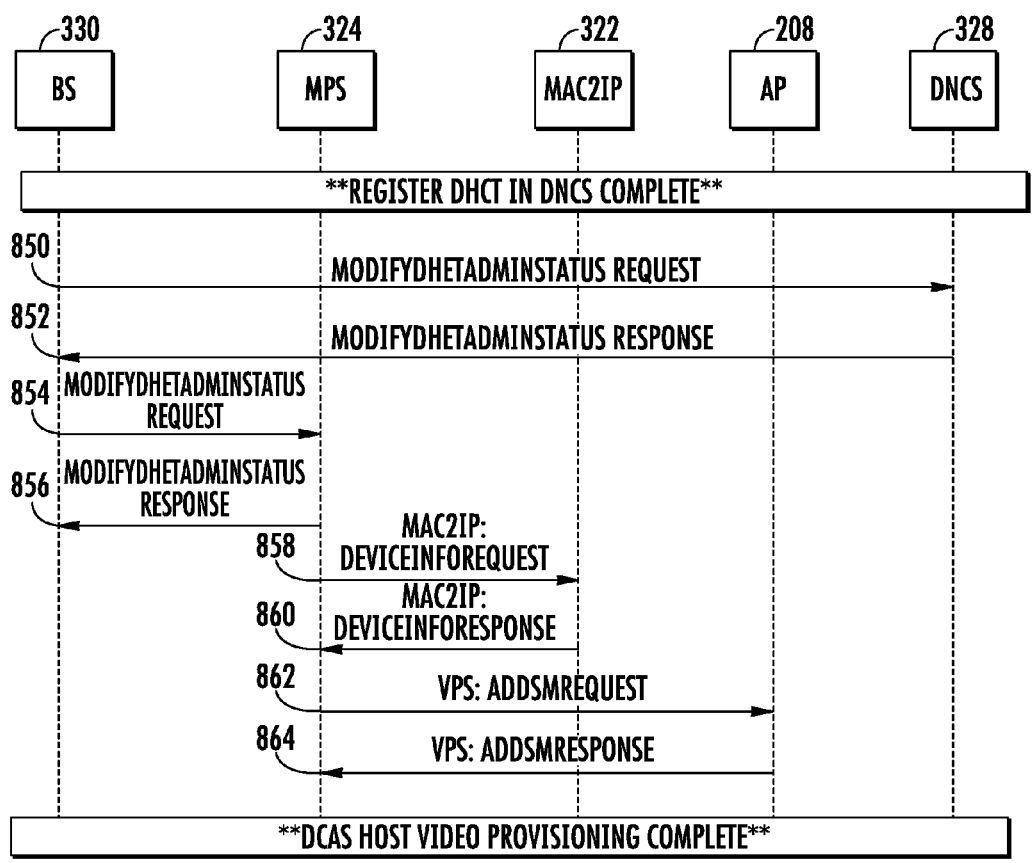
FIG. 8b shows an exemplary message exchange during provisioning of a new host device in accordance with one embodiment of the invention.

FIG. 8b shows the details of an exemplary message exchange during provisioning of a host device 210 according to one embodiment of the invention. These messages are exchanged between the BS 330, the MPS 324, the Mac2IP server 322, the AP 312 and/or the DNCS server 328 as described below.

When the BS 330 receives a manual request to provision a DCAS host as part of the customer order entry process, it sends a ModifyDhctAdminStatus request 850 to the DNCS to initiate the video provisioning of the DCAS host. The DNCS generates a ModifyDhctAdminStatus response 852, addressed to the BS, after successfully changing the configuration of the host device 210 corresponding to the ModifyDhctAdminStatus request that was received. The BS also generates a ModifyDhctAdminStatus request 854 addressed to the MPS to initiate the DCAS provisioning of the DCAS host. After receiving this message, the MPS sends a Modify- DhctAdminStatus response message 856 to the BS. The MPS requests device information (e.g., IP address, SMID, & TPID) from the Mac2IP server by sending a message thereto 858. The Mac2IP server responds to MPS with the requested device information, if known by sending a DeviceInfoResponse message 860. The MPS transmits an AddSmRequest message 862 to the DCAS AP within the DCAS Infrastructure corresponding to the location of the set-top on the network. The AP 208 indicates the successful addition of the SM identifying information to its internal data store by responding to the MPS with an AddSmResponse message 864. At this point, the SM (within the DCAS host) is prepared to proceed with DCAS authentication and client image download, further described below.

Figure 9A:
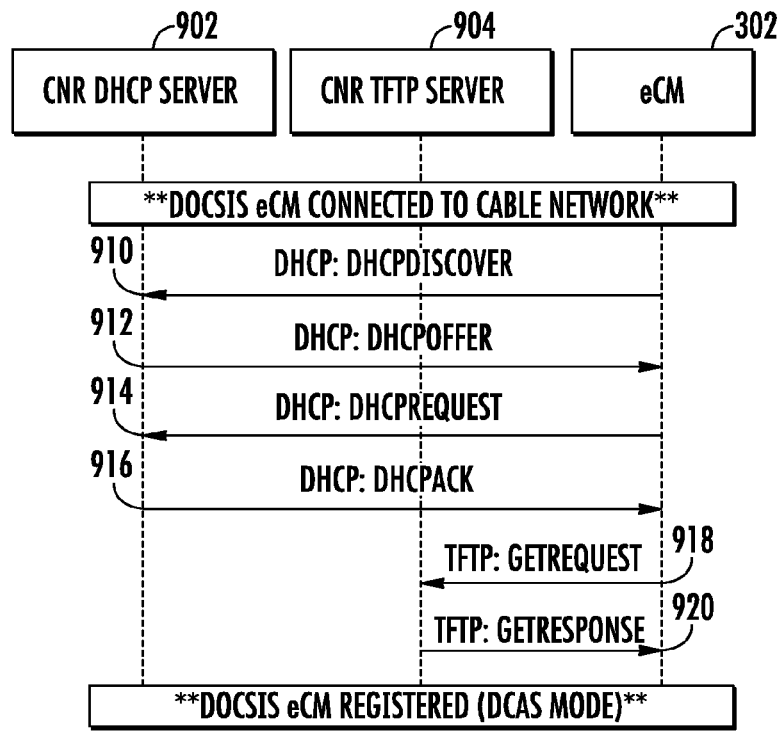
FIG. 9a shows an exemplary message exchange during registration of eCM in provisioning of a new host device in accordance with one embodiment of the invention.

FIG. 9a shows details of exemplary messages exchanged during the implementation of step 800 of FIG. 8a previously discussed, wherein the eCM 302 registers itself in the network. The following messages are exchanged between a DHCP server 902 in the CNR, a TFTP server 904 in the CNR, and/or the eCM part 302 of the host device 300. With the eCM in communication with the network, the eCM first sends a DhcpDiscover request 910 to the DHCP server 902. The DHCP server is in a state to recognize the eCM and responds with a DHCP Offer message 912 containing an IP address appropriate for the DCAS host eCM 302. The DHCP server includes in the Offer message 910 the proper DOCSIS configuration file name. In reply to this, the eCM sends a DHCP Request message 914 to the DHCP server. The DHCP server responds with a DHCP Ack message 916 containing an IP address appropriate for the eCM. The DHCP server includes in the Ack the appropriate DOCSIS configuration file name for the eCM. Upon obtaining the IP address and location of the configuration file, the eCM requests from the TFTP server 904 by sending a GetRequest message 918 the configuration file named in the DHCP acknowledgement from the DHCP server. The TFTP server responds with a GetResponse message 920, and sends the requested CM configuration file.

Figure 9B:
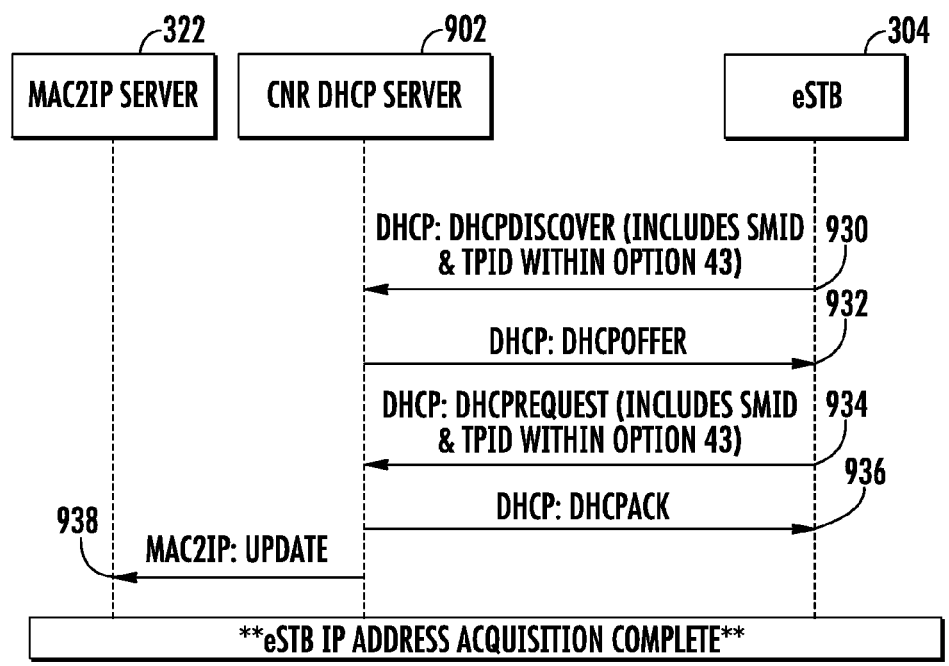
FIG. 9b shows an exemplary message exchange during registration of eSTB in provisioning of a new host device in accordance with one embodiment of the present invention.

FIG. 9b shows the detail of an exemplary message exchange during the implementation of step 802 of the method of FIG. 8a, in which the eSTB 304 acquires an IP address. The messages are exchanged among the Mac2IP Server 322, the CNR DHCP server 902 and the eSTB 304 function of the host device 210. In step 802, the eCM is in a state where it can bridge two-way traffic from the eSTB to the DOCSIS network where the traffic is forwarded to servers in the operator's infrastructure. The eSTB function 304 generates a DHCP Discover message 930, which includes its SMID & TPID (e.g., within DHCP Option 43). The DHCP server 902 recognizes the eSTB, and responds with a DHCP Offer message 932 containing an IP address appropriate for the eSTB. The eSTB then generates a DHCP Request message 934, which includes its SMID & TPID within DHCP Option 43. The DHCP server recognizes the eSTB, and responds with a DHCP Ack message 936 containing an IP address appropriate for the eSTB. The DHCP server then updates Mac2IP with the eSTB's MAC address, IP Address, SMID, & TPID by sending an Update message 938.

Figure 10:
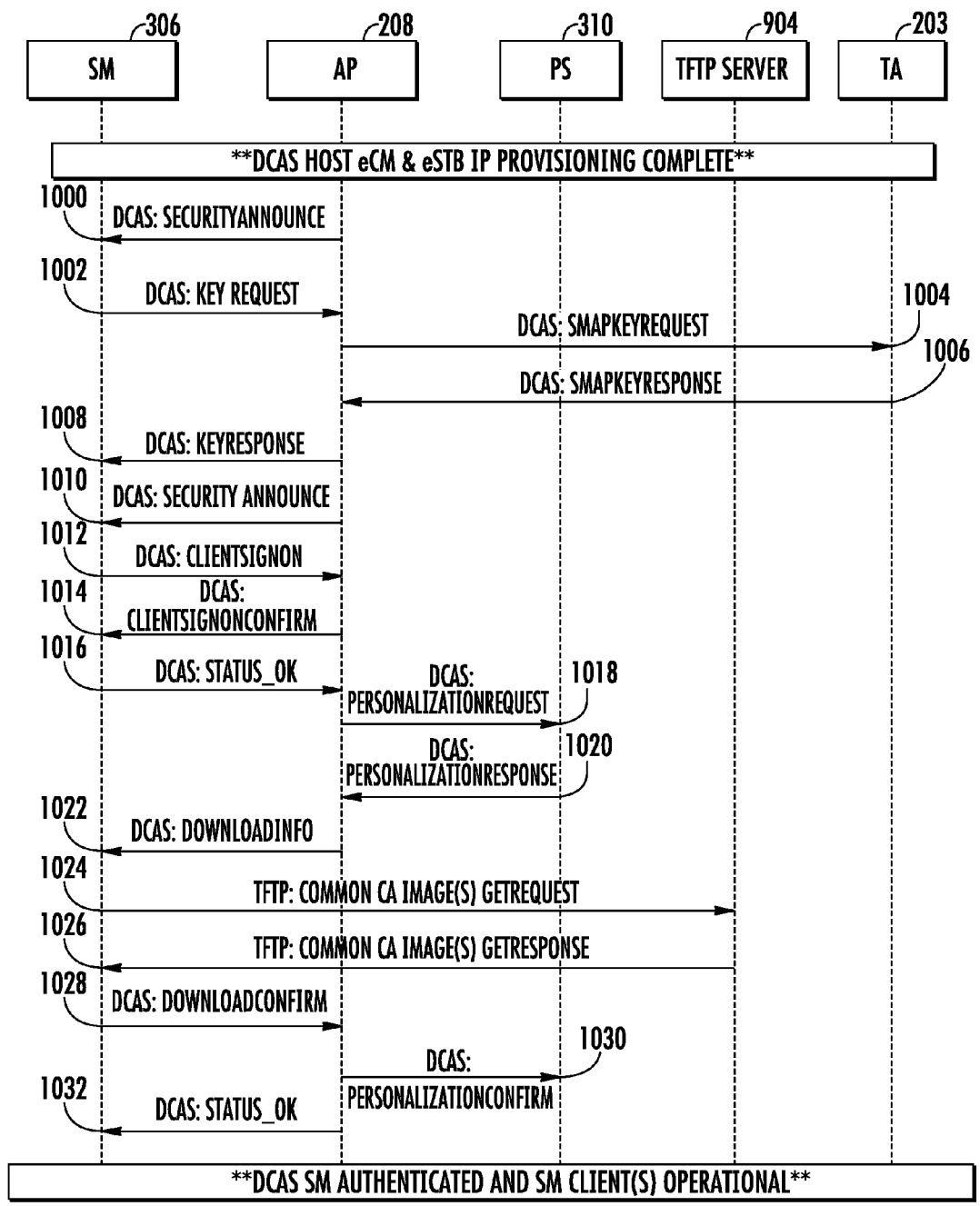
FIG. 10 shows an exemplary message exchange during authentication of a secure microprocessor (SM) during provisioning of a host device in accordance with one embodiment of the present invention.

FIG. 10 shows the details of an exemplary message exchange during the authentication of SM 306 in step 804 of FIG. 8a. The messages are exchanged among AM 306, AP 208, PS 310, TFTP server 904, and TA 203. The AP is in the illustrated embodiment preconfigured with an approved SM client image list, and periodically generates a DCAS SecurityAnnounce multicast message 1000, which includes the SM client image list, and transmits it to the DOCSIS network. The SM does not recognize the identification of the AP included in the SecurityAnnounce message 1000, and generates a DCAS KeyRequest message 1002 to the AP 208. The AP forwards this message to TA 203 via a DCAS SmApKeyRequest message 1004, and requests keys for the SM from the TA by setting the value of the KeyRequestFlag element of this message to "TRUE". The TA 203 responds with a DCAS SmApKeyResponse message 1006 to the AP. This message contains a KeyResponse message and updated SM keys for the AP 208. The AP stores the SM keys (either locally or remotely at a designated storage location), and transmits the DCAS KeyResponse message 1008 to the SM. The SM of the host 210 stores the keys sent to it by the AP.

In a subsequent step, the AP sends to the SM a DCAS SecurityAnnounce multicast message 1010. The SM recognizes the identification of the AP in the SecurityAnnounce message, and generates a DCAS ClientSignOn message 1012 for transmission to the AP. This message includes SM Class Identifier, a current list of SM (e.g., CA) Client Identifiers, and SMID. The AP 208 generates a DCAS ClientSignOnConfirm message 1014 for transmission to the SM. This message includes fields filled by the AP based on certain criteria. For example, in one embodiment, the AP compares the SM Class Identifier and list of SM Client Identifiers to the list of approved SM Client Identifiers for this SM. If the lists match, then the AP returns a DCAS ClientSignOnConfirm message indicating that the SM Clients are up-to-date, and do not require download. If the lists do not match, then the AP returns a DCAS ClientSignOnConfirm message that contains the list of approved SM Client Identifiers.

If the SM requires new client downloads because the SM client (e.g., CA client) list did not match, the SM generates a DCAS Status message 1016, indicating that ClientSignOnConfirm message was accepted, by including a status code of "STATUS OK". When the AP receives this message, it generates a request 1018 to the PS for Client Images (both Common and Personalized). The PS will check if the host device 210 containing the SM is properly configured in the DNCS. If the device is properly configured, the PS responds in message 1020 to the AP request with both a Common Image (CI) download directive and a Personalized Image (PI) attachment. The AP then generates a DCAS DownloadInfo message 1022 to the SM. This message contains the CI download directive and the PI attachments. The SM downloads each CI based on the information in the DCAS DownloadInfo Message. As directed by the PS message 1020 forwarded by the AP, either a TFTP server or another alternative scheme such as Object Carousel can be used to deliver the Common Images. If TFTP mechanism is used, the SM requests by sending message 1024 the specified Common Images from the TFTP server 904. The TFTP server delivers the Common Images to the SM in a message 1026, although other approaches may be used with equal success.

The SM completes the entire Common Image download process, and generates a DownloadConfirm message 1028 to the AP. In this message, the SM indicates the current client status for each SM Client. The AP generates a PersonalizationConfirm message 1030 to the PS 310, informing the PS that a personalized SM client image has (or has not) been installed on the SM. The AP 208 sends a DCAS Status message 1032 to the SM, indicating the DownloadConfirm message was received, by including a status code of "STATUS_OK".

Deactivate Host Provisioning Flow (On Network)—

A host device 210 may also be deactivated (or de-provisioned) while being connected to the network. A CSR or other entity initiates the deactivation by entering an order in the BS. The order is then further propagated in the network by e.g., message exchanges among the appropriate servers, leading to deactivation of the host, based in the exemplary embodiment on deactivation of the SM within the host. Further details of one exemplary implementation of this process are described below.

Figure 11:
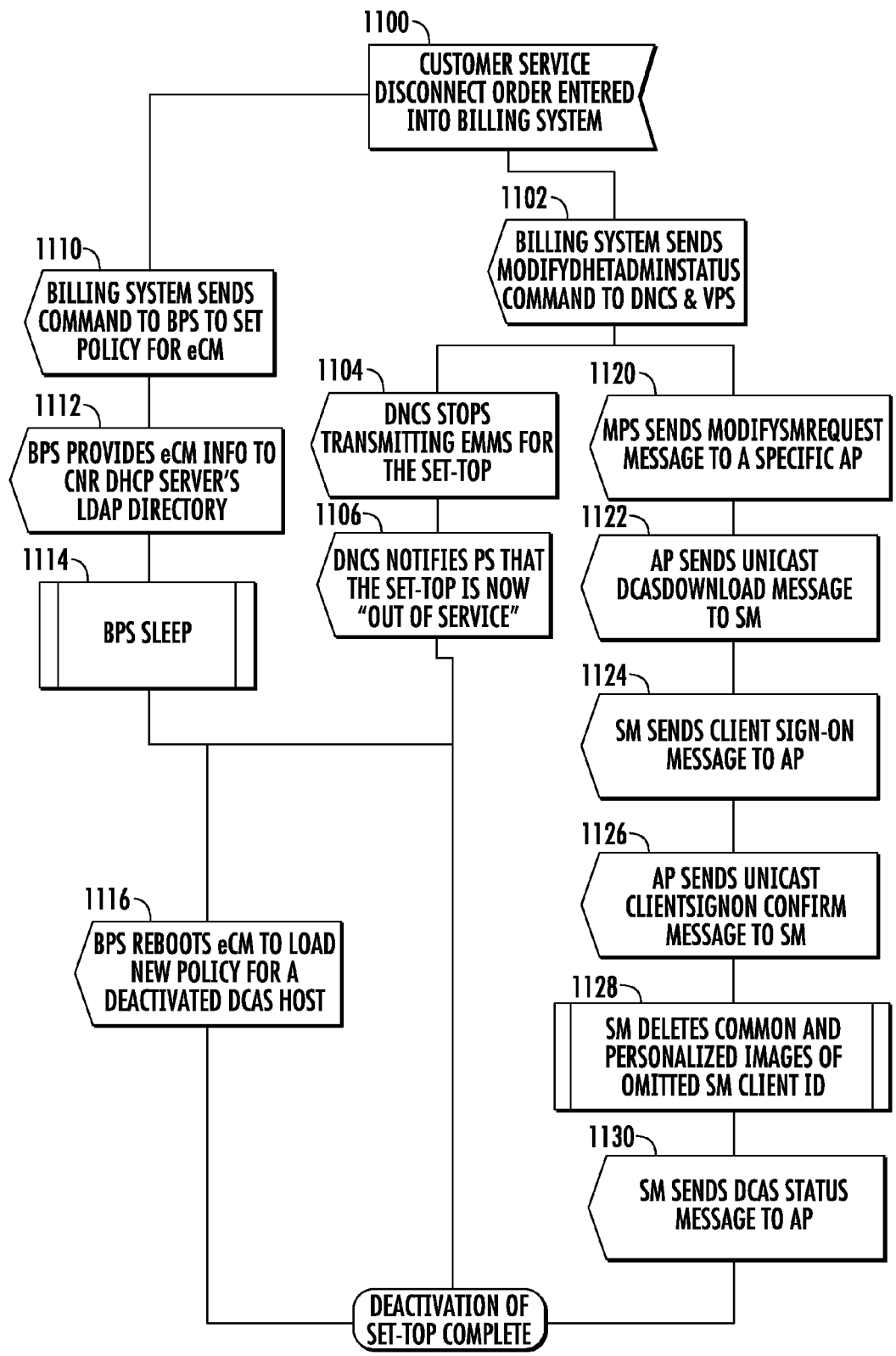
FIG. 11 is a logical flowchart showing the steps of an exemplary method of de-provisioning a host device connected and online in the network.

FIG. 11 shows exemplary steps performed when a previously provisioned host device 210 is to be deactivated. First, an order to disconnect or otherwise disable the host device is entered in the BS by a Customer Service Representative (CSR) or similar entity request that starts the process of deactivation. When the order is entered in the BS, the BS sends, in step 1102, a ModifyDhctAdminStatus command to the DNCS and MPS. When the DNCS receives this command, in the next step 1104 it stops transmitting EMMs to the host device 210. The DNCS also notifies the PS in step 1106 that the host device has now been taken out-of-service. When the MPS receives command in step 1102, it sends a ModifySMRequest message per step 1120 to a specific AP 208 that is communicating with the SM in the host device 210. Table 2 shows an example of parameters included in the exemplary configuration of the ModifySMRequest message. Table 5 shows exemplary implementation details for these parameters.

When the AP 208 receives the request from the MPS, it sends a unicast DCASDownload message to the SM within the host device. In the next step 1124, the SM sends a ClientSignOn message to the AP. In the next step 1126, the AP sends a unicast ClientSignOn confirmation message to the SM. When it gets this message, in the next step 1128, the SM deletes the common and personalized images corresponding to the personalized image programmed in the host device. Next, in step 1130, the SM sends a DCAST status message to the AP.

As shown in FIG. 11, in step 1112, the BPS provides eCM information to the CNR DHCP server's LDAP directory. In the next step 1116, the BPS goes in a wait state for the other tasks. When steps 1116, 1130 and 1106 are completed, the de-activation of the host device 210 is complete.

TABLE 2

| Parameter |
|---|
| HostHardwareIdentifier |
| HostIpAddress |
| PSIdentifier |
| PSIpAddress |
| SMClassIdentifier |
| SMClientIdentifier1 |
| SMClientIdentifier2 |
| SMClientIdentifierN |
| SMIdentifier |
| TPIdentifier |

Deactivate Host Provisioning Flow (Off Network)—

In some cases, the network operator may desire to deactivate a host device while the device is passive (i.e., not connected to the network or able to actively participate). For example, the host device 210 may be turned off or otherwise disconnected by the user. The present invention provides for performing such deactivation by exchanging messages among servers on the network side, advantageously without the need of any message response from the host device being deactivated.

Figure 12:
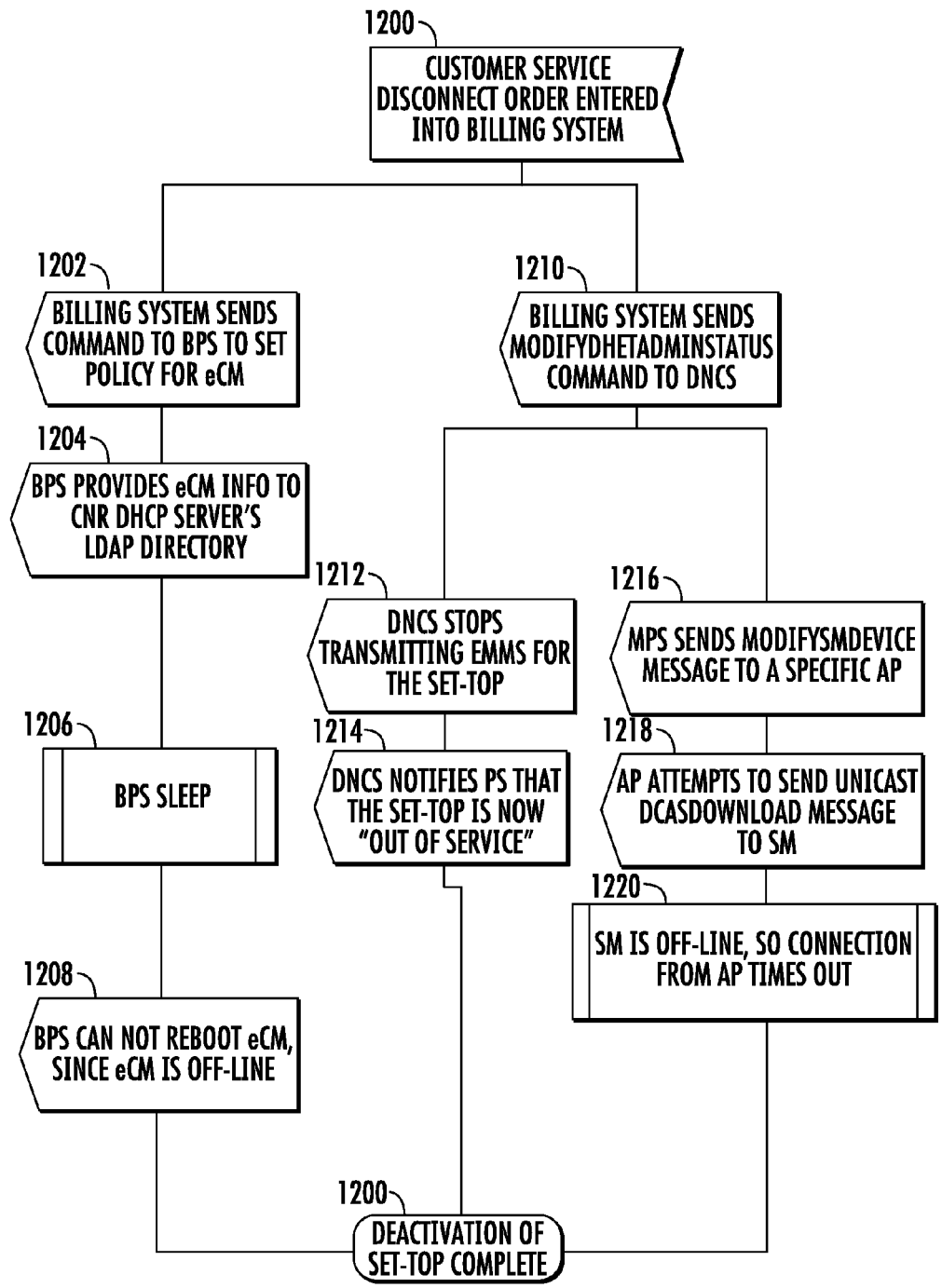
FIG. 12 is a logical flowchart showing the steps of an exemplary method of de-provisioning a host device not connected or online in the network.

FIG. 12 shows the process of deactivation of a host device that is not currently online and communicating on the network according to one embodiment of the invention. In step 1200, which starts the process of deactivation, an order to disconnect the host device is entered in the BS by a CSR request or via another entity (e.g., automated process). When the order is entered in the BS, the BS sends (per step 1210) a command to the DNCS and MPS 324. When the DNCS receives this command, it stops transmitting EMMs to the Host device (step 1212). The DNCS also notifies the PS 310 in step 1214 that the host device has now been taken out-of-service. When the MPS receives the command in step 1102, it sends a ModifySMDevice message in step 1216 to a specific AP 208 that is communicating with the SM in the target host device. In step 1218, when the AP receives the request from the MPS, it sends a unicast DCASDownload message to the SM within the host device. Next, because the SM is off-line in this case, the connection from AP times out (step 1220).

As shown in FIG. 12, after step 1200, the BS sends a command to the BPS to set policy for the eCM of the host device (step 1202). In the next step 1204, the BPS provides information regarding the eCM to the CNR DHCP server's LDAP directory. After finishing this step, the BPS implements a sleep or inactive state 1206. Next, the BPS may attempt to reboot eCM in the host device (step 1208). However, because the host device is off-line, this attempt will fail. When steps 1208, 1214 and 120 are completed, the "passive" de-activation of the host device is complete.

Replace Client Provisioning Flow—

An additional task which may be desired by the network operator is to change (add, delete, replace, or modify) the CA or other system residing on the SM within the host device 210. Such a need may arise due to availability of a new CA (or DRM or TD/ASD) system or version within a network, or physical relocation of a host device within the network, or other deployment or business requirements.

Figure 13:
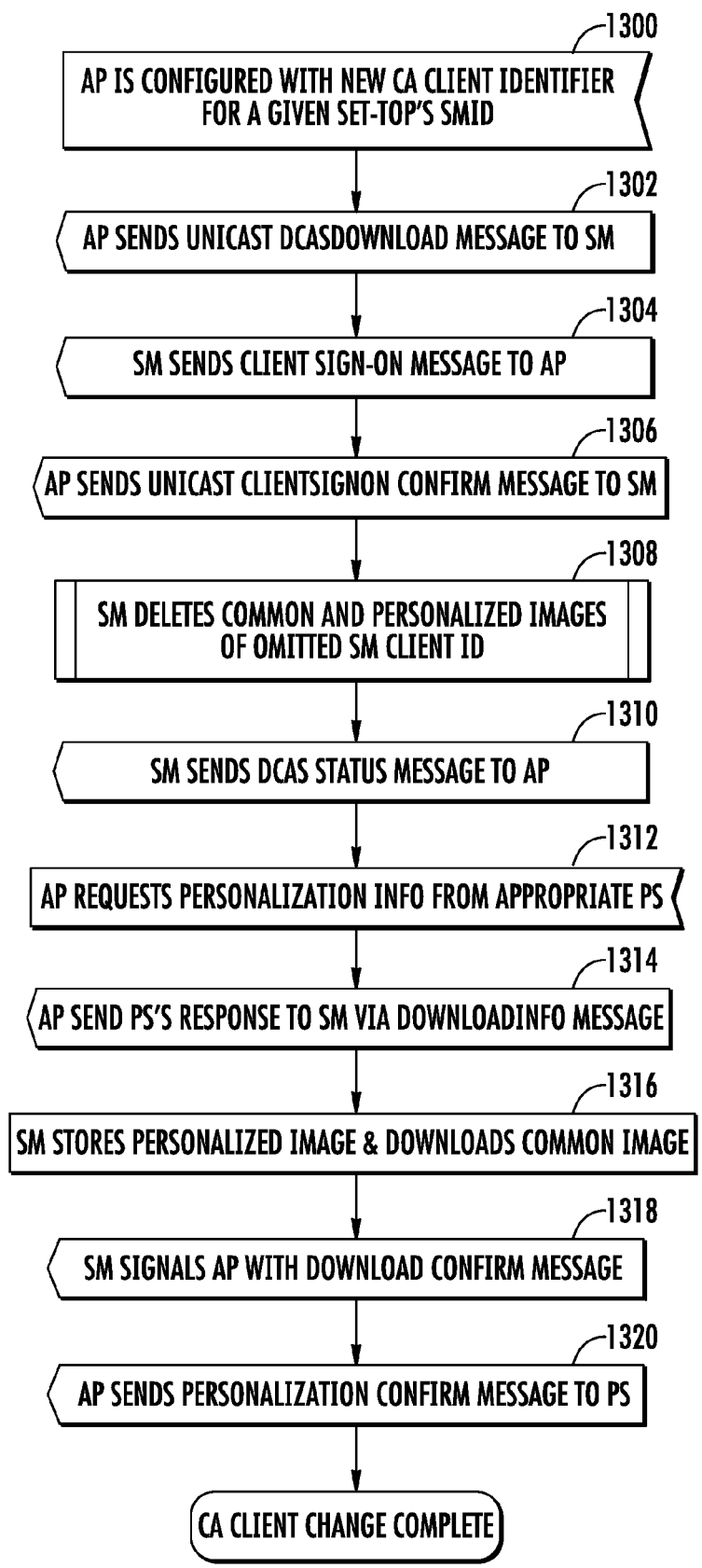
FIG. 13 is a logical flowchart showing the steps of an exemplary method of changing the Conditional Access (CA) client image in a host device in accordance with one embodiment of the present invention.

FIG. 13 shows exemplary steps taken when client (e.g., CA client) is replaced according to one embodiment of the invention. At the beginning of the process, an entity (e.g., human operator, automated software process, etc.) configures the AP 208 that is communicating with the target host device with a new CA system identifier (including the target host device's SM identification). When the operator entity instructs the AP to change CA client, it then sends a DCASDownload message to the SM per step 1302. In an exemplary embodiment, this message is unicast to the SM, although other mechanisms may be used consistent with the invention.

Upon reception of this message, in step 1304, the SM sends a ClientSignOn message to the AP 208. As a reply to this message (step 1306), the AP sends a ClientSignOnConfirm message to the SM. In the exemplary embodiment, this message is also unicast to the SM. When the SM receives this message per step 1308, it deletes both the common and personalized images (CI and PI) of the SM Client ID that is being deleted.

Next, in step 1310, the SM sends a DCAS Status message to the AP. AP then requests personalization information in step 1312 from the appropriate PS 310. After the AP receives the personalization information, it sends this information to the SM via a DownloadInfo message in step 1314. In the subsequent step 1316, the SM stores the personalized information in the form of a personalized image (PI) and downloads the common image (CI). Upon completion of this step, the SM signals the AP of the success in step 1318 by sending a DownloadConfirm message to the AP. The AP 208 conveys this confirmation to the PS in step 1320. Once the AP notifies the PS, the client change is complete.

MPS Workflows Triggered by the Billing System—

Figure 14:
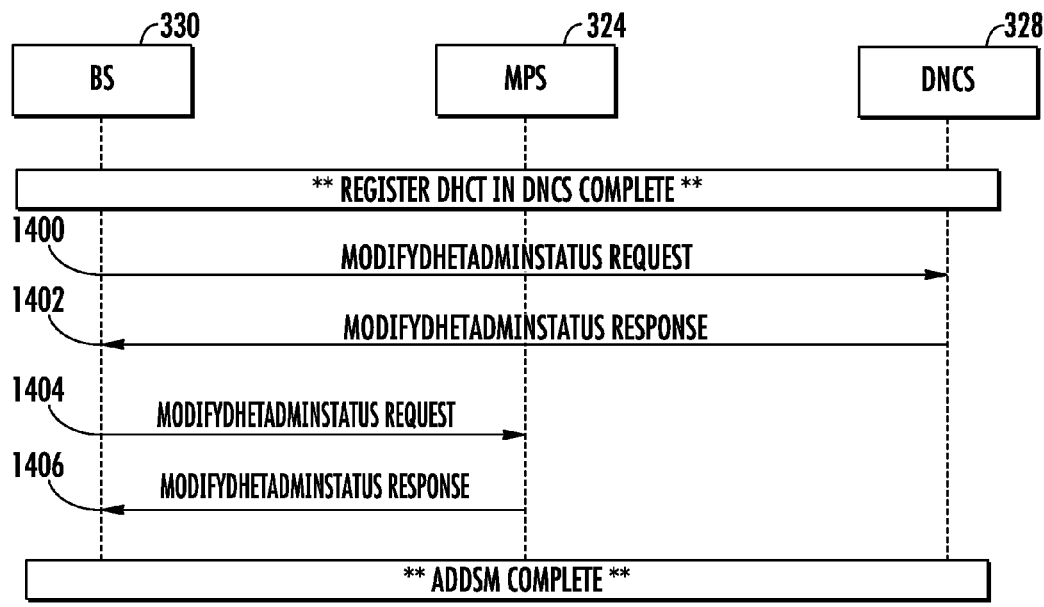
FIG. 14 is a logical flowchart showing the steps of an exemplary method of adding an SM to database in accordance with one embodiment of the present invention.

FIG. 14 shows messages exchanged among BS 330, MPS 324 and DNCS 328 in the process of adding an SM to the MPS database of devices according to one exemplary embodiment. To begin the process, the BS receives a request to provision a DCAS host as part of the customer order entry process. In turn, the BS generates a BOSS ModifyDhctAdminStatus Request 1400, addressed to the DNCS, to initiate the video provisioning of the DCAS Host. The DNCS generates a BOSS ModifyDhctAdminStatus Response 1402 after successfully changing the configuration of the host device corresponding to the ModifyDhctAdminStatus Request, and sends it back to the BS. The BS also generates a BOSS ModifyDhctAdminStatus Request 1404 to initiate the DCAS provisioning of the DCAS host, and sends it to the MPS 324. After receiving the BOSS ModifyDhctAdminStatus Request message, the MPS sends a BOSS ModifyDhctAdminStatus Response message 1406 to the indicating success or failure.

Figure 15:
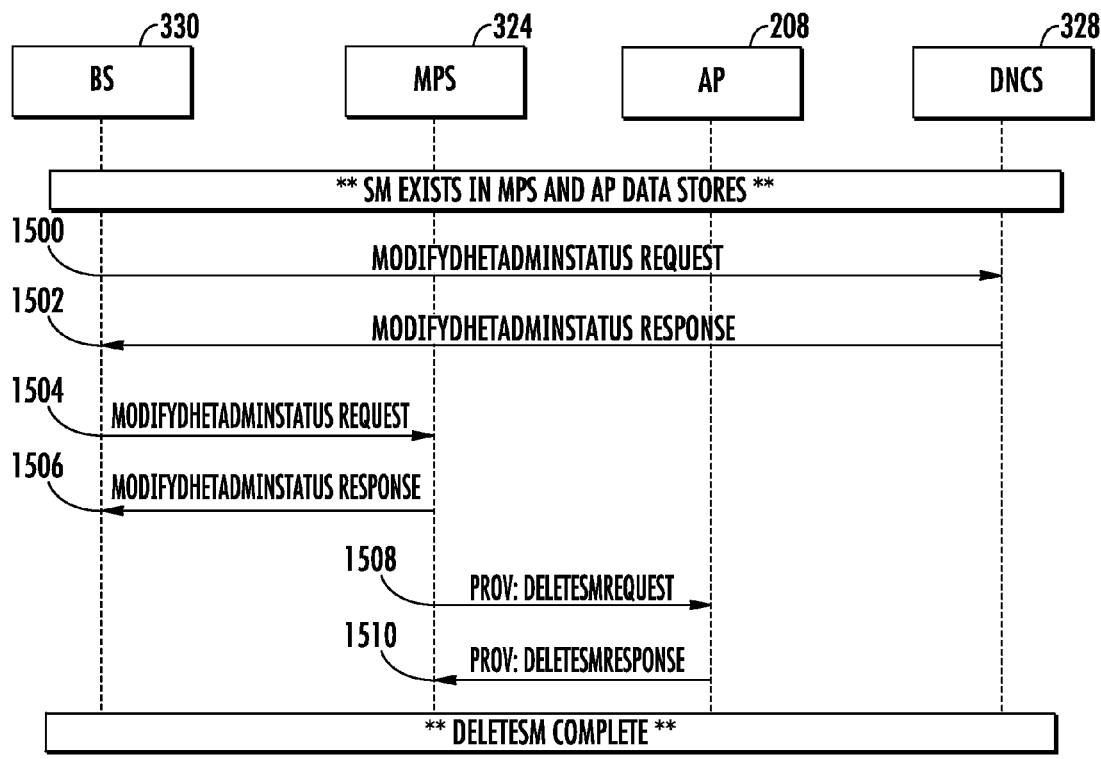
FIG. 15 is a logical flowchart showing the steps of an exemplary method of deleting an SM entry from database in accordance with one embodiment of the present invention.

FIG. 15 shows exemplary messages exchanged to remove an SM device and configuration from the DCAS infrastructure and the MPS's database. This action is triggered when the BS 330 receives a manual request to deactivate a DCAS host as part of the customer change process. In turn, the BS generates a BOSS ModifyDhctAdminStatus Request 1500 to deactivate the DCAS host and sends it to the DNCS. After successfully changing the configuration of the corresponding host device 210, the DNCS sends back a BOSS ModifyDhctAdminStatus Response 1502 to the BS. The BS 330 also generates a BOSS (Business Operations Support System) or similar BOSS ModifyDhctAdminStatus Request 1504 to deactivate the DCAS host and sends it to the MPS. In reply, the MPS 324 sends back a BOSS ModifyDhctAdminStatus Response back to the BS. The MPS sends a DeleteSmRequest message 1508 to the AP 208 to deactivate the SM.

Table 3 shows exemplary parameters included in the DeleteSmRequest message. Table 5 shows exemplary implementation details for these parameters.

The AP 208 ultimately sends a DeleteSmResponse message 1510 to the MPS confirming the deactivation.

TABLE 3

| Parameter |
|---|
| HostHardwareIdentifier |
| SMIdentifier |
| TPIdentifier |

MPS Workflow Triggered by Configuration Changes—

A MPS workflow may be triggered when a major configuration change is made in the MPS, such as a change in the assignment of SM Client IDs to a specific SM Class ID, or a change in the assignment of SM Client IDs to a specific Secure Micro Identifier or host Hardware Identifier.

Figure 16:
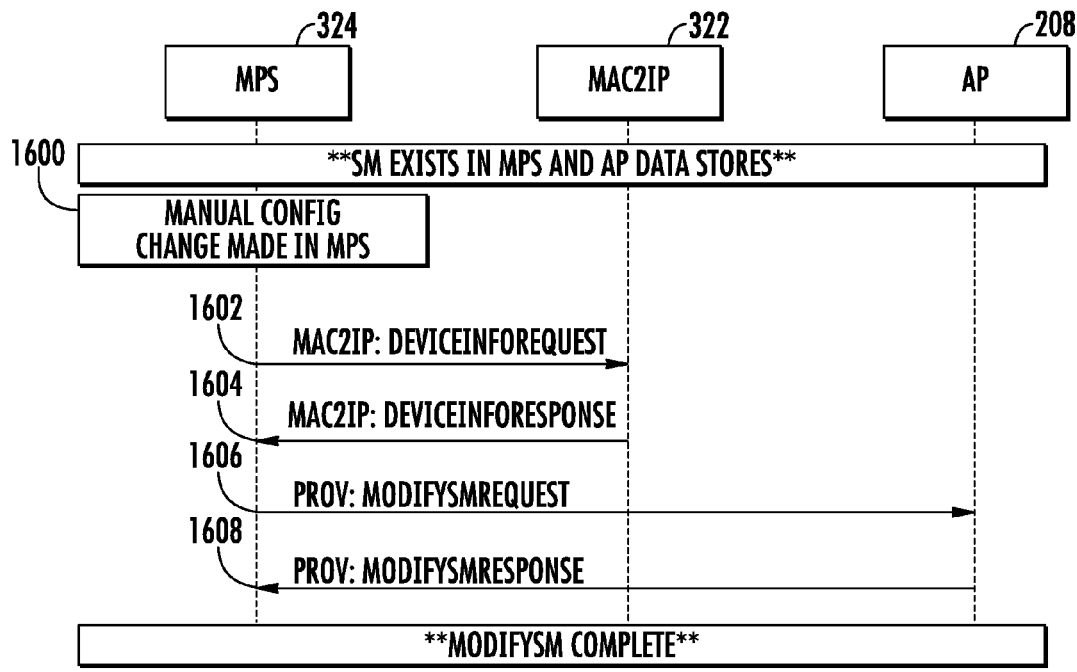
FIG. 16 is a logical flowchart showing the steps of an exemplary method of modifying an SM entry in database in accordance with one embodiment of the present invention.

FIG. 16 shows an exemplary message exchange when a configuration change is made in the MPS according to one embodiment of the invention. To begin the message exchange, in step 1600, the MPS is updated to modify the configuration parameters (e.g. the list of SM Client IDs) to be assigned to a given SM. The MPS then sends a query 1602 by MAC address to the Mac2IP server to learn the current IP address of the Host device, its SM identifier and its TP identifier. The Mac2IP server responds with the requested information by sending back a DeviceInforResponse 1604. The MPS assembles the information received from the Mac2IP server response, from manual configuration and from previously stored information and sends a ModifySmRequest message 1606 to the AP. The AP 208 updates its data store with the new configuration information and sends a ModifySmResponse message 1608 back to the MPS confirming successful change in the configuration.

MPS Workflow Triggered by the AP—

A MPS 324 workflow will be triggered when the MPS receives a certain message from the AP 208. The SmInfo workflow is used if the AP is communicating with an SM for which it does not have a complete set of identification and configuration information (e.g., as shown in Table 4). The AP sends a SmInfoRequest message to the MPS to request the current identification and configuration information for the DCAS host eSTB. The MPS 324, in turn, performs a Mac2IP lookup (e.g., by IP address) of the DCAS host eSTB, assembles the Mac2IP response with data it previously obtained from the Billing System (BS), updates the MPS data store, and reports the complete set of identification and configuration information to the AP 208.

Figure 17:
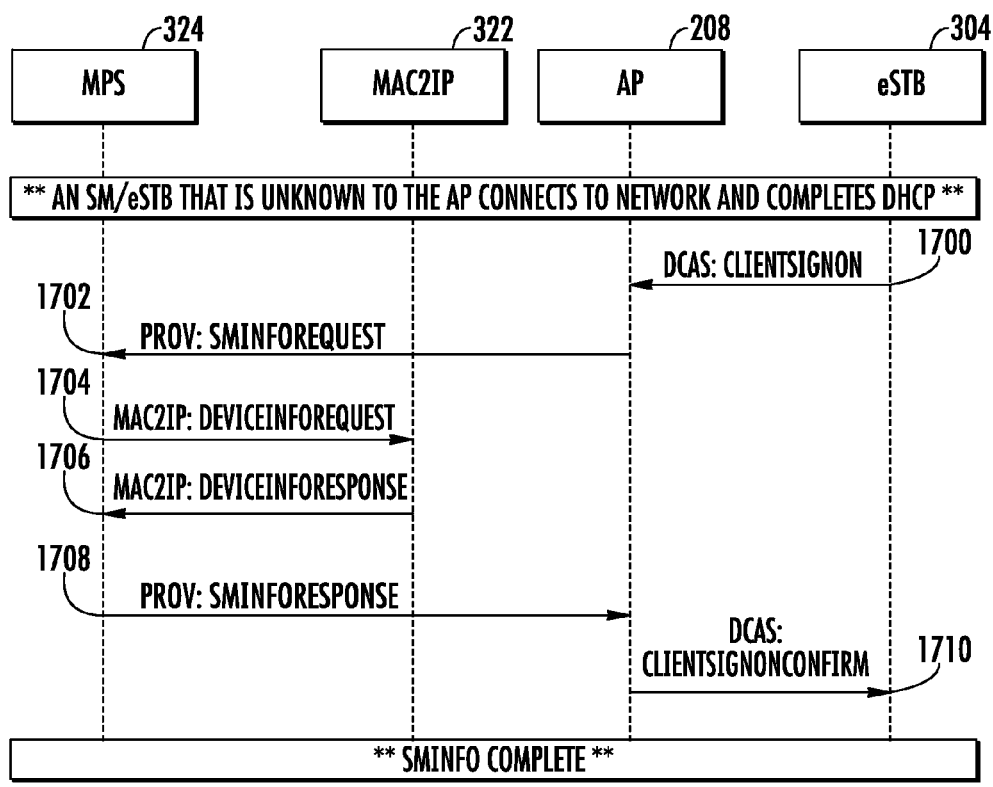
FIG. 17 is a logical flowchart showing the steps of an exemplary method of querying an SM entry in database in accordance with one embodiment of the present invention.

FIG. 17 shows an exemplary message exchange by which updates to the MPS's database and the AP's database are made. The exchange begins when an SM that is unknown to the AP 208 sends a ClientSignOn or KeyRequest message 1700 to the AP. The AP sends an SmInfoRequest message 1702 to the corresponding MPS, to obtain the complete identification and configuration information for the SM. The MPS 324 sends a query 1704 to the Mac2IP server to learn Host-HardwareIdentifier, SMIdentifier, and TPIdentifier of DCAS host eSTB. The Mac2IP server responds with requested information in a DeviceInfoResponse message 1706. The MPS assembles the received SM identification and configuration information from the Mac2IP server response, from configuration information (e.g., entered manually or otherwise), and from previously stored information, and sends an SmInfoResponse message 1708 to the AP. Table 4 shows an example of parameters included in the SmInfoResponse message. Table 5 shows exemplary implementation details for these parameters. The AP creates new record in its internal data store using the information from this message and sends a ClientSignOnConfirm message 1710 to the SM.

TABLE 4

| Parameter | Description |
|---|---|
| HostHardwareIdentifier | Need not be present if ResponseCode = 0 |
| HostIpAddress | Need not be present if ResponseCode = 0 |
| PSIdentifier | Need not be present if ResponseCode = 0 |
| PSIpAddress | Need not be present if ResponseCode = 0 |
| SMClassIdentifier | Need not be present if ResponseCode = 0 |
| SMClientIdentifier1 | Need not be present if ResponseCode = 0 |
| SMClientIdentifier2 | Optional |
| SMClientIdentifierN | Optional |
| SMIdentifier | Need not be present if ResponseCode = 0 |
| TPIdentifier | Need not be present if ResponseCode = 0 |
| ResponseCode | 0 = MPS has incomplete information for this host |
| | 1 = MPS has complete information for this host |

Table 5 shows additional details of an exemplary implementation of various parameters used in the messages exchanged in accordance with the described embodiments of the present invention. For each parameter listed under the Parameter column, the Type column indicates the type of the parameter, the Length column indicates exemplary byte length of the parameter, and the Description column provides additional details of the parameter.

TABLE 5

| Parameter | Type | Length | Description |
| --- | --- | --- | --- |
| HostHardwareIdentifier | MAC Address | 6 octets | The HostHardwareIdentifier element is the globally unique hardware identifier assigned to the Host containing a SM (e.g. an IEEE 48-bit Hardware Address). |
| HostIpAddress | IPv4 Address | 4 octets | The HostIpAddress element is the IP address assigned, via DHCP, to a Host containing an SM. |
| PSIdentifier | Integer | 4 octets | The PSIdentifier element is the globally unique identifier assigned to a PS. The value of PSIdentifier is assigned by the TA to the PS at the time the PS is provisioned. |
| PSIpAddress | IPv4 Address | 4 octets | The PSIpAddress element is the globally unique IP address assigned to the PS when the PS is deployed. |
| SMClassIdentifier | Integer | 8 octets | The SMClassIdentifier element identifies the hardware and Boot loader versions of the SM device. |
| SMClientIdentifier1 | Integer | 6 octets | Identifies a unique SM Client Image. |
| SMClientIdentifier2 | Integer | 6 octets | Identifies a unique SM Client Image. |
| SMClientIdentifier3 | Integer | 6 octets | Identifies a unique SM Client Image. |
| SMIdentifier | Integer | 1–40 octets | The SMIdentifier element is the globally unique identifier assigned to a SM at time of manufacture. |
| TPIdentifier | Integer | 1–8 octets | The TPIdentifier element identifies the globally unique TP Identifier of the Transport Processor paired with the SM within the DCAS Host. |

MPS to AP Communication Protocol—

The interface between a MPS 324 and an AP 208 optionally can be implemented as a Web Service (WS) interface, compatible with existing interface conventions applied elsewhere within a network operator's DCAS infrastructure. For example, the interface may be implemented using the Simple Object Access Protocol (SOAP) document style encoding. The MPS could also support hypertext transport protocol (HTTP) and secure HTTP (HTTPS) protocols to establish WS connections and secure data traffic. The MPS-to-AP interface can implement for example Transport Layer Security (TLS) which provides a standard method for the mutual authentication and the secure exchange of data between parties in the DCAS architecture. Since TLS relies on the exchange of X.509 certificates for authentication, and the agreed use of specific TLS Cipher suites for the exchange of data, such an implementation can advantageously provide an interoperable solution with multiple vendors' equipment.

Business/Operational Rules Engine and Methods—

In another aspect of the invention, a processing entity (e.g., rendered as one or more computer programs disposed within the head-end (e.g., MPS 324, AP 208, PS 310, etc.), BSA hub entity, CPE 106, or other location) includes a so-called "rules" engine. This engine comprises, in an exemplary embodiment, one or more software routines adapted to control the operation of the security management architecture, including the media provisioning system 324, in order to achieve one or more goals relating to operations or business (e.g., profit). Included within these areas are implementation of security management policies that can increase network optimization and reliability, increase maintenance intervals, increase subscriber or user satisfaction, increase subscription base, higher profit (e.g., from increased advertising revenues, more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities (such as the aforementioned security management architecture of FIG. 3), and controlled via e.g., a user interface such as a GUI on a PC connected to the relevant device. In effect, the rules engine comprises a supervisory entity which monitors and selectively controls security management operation processes at a higher level, so as to implement desired operational or business rules. The rules engine can be considered an overlay of sorts to the more fundamental algorithms used to accomplish required security functions and network operation, such as key management, encrypted image generation, TD/ASD or DRM configuration, IP address assignment, statistical multiplexing, BSA switching, and so forth.

For example, the MPS portion 324 of the network security management apparatus (or CPE) may invoke certain operational protocols or decision processes based on information or requests received from the CPE, conditions existing within the network, demographic data, geographic data, etc. However, these processes may not always be compatible with higher-level business or operational goals, such as maximizing profit, bandwidth management, or system reliability. Hence, when imposed, the business/operational rules can be used to dynamically (or manually) control the operation of the download, provisioning, and/or Client process on the CPE 106 or within other domains (e.g., SOD or NSODs in communication with the TD). The rules may be, e.g., operational or business-oriented in nature, and may also be applied selectively in terms of time of day, duration, specific local areas, or even at the individual user level (e.g., via specific identification of the CPE or client device via TUNER_ID, MAC address, SM identifying information or the like).

For example, one rule implemented by the rules engine may comprise only providing certain types or program recording and/or distribution features to certain subscribers or classes of subscribers. The subscriber CPE 106 may possess a Firewire (IEEE-1394) interface or other such interface capable of transmitting content to a connected device for example, but the ability to transfer such protected content out of the TD not be made available to such subscribers unless they met certain criteria (e.g., "premium" subscription, etc.).

Another rule might impose a moratorium or restrictions on downloading secure images (e.g., SM Clients) or download keys to the host/CPE 106 during conditions of very heavy loading, e.g., until a certain minimum threshold of available bandwidth is present, thereby avoiding contention for bandwidth resources with "premium" services such as DOCSIS cable modem Internet access. Similarly, processing typically done upstream of the CPE could be dynamically shifted to the CPE under such circumstances so as distribute the processing load (and hence downstream messaging bandwidth consumed) to the CPE.

Similarly, another rule might comprise controlling and rate-limiting the region over which any bulk upgrade of SM Client images is performed in order to limit the amount of network traffic and host resource load added during SM Client image downloads.

Premium subscribers might also be given "head of the line" privileges where any contention exists for SM Client download or provisioning requests or keying (such as by way of a "bottleneck" at the TA 203).

Moreover, premium subscribers might be given a greater scope of options and choices; e.g., the ability to use a wider range of CPE (e.g., new DSTBs introduced in the retail market), while more basic subscribers are limited as to the type of device they may use as part of their subscription. Billing policies and procedures might also be modified as a function of subscription level or some other parameter.

The establishment of a trusted domain, conditional access perimeter, and/or digital rights policies may also be made in a substantially dynamic fashion using the methods and apparatus of the invention. For example, an MSO might know that a given subscriber or premises might only use recording or personal media devices (PMDs) during certain time periods (e.g., weekends) based on, e.g., historical data, subscription restrictions, or other operational factors or conditions. Hence, extension of the TD to include these capabilities, and necessary permissions, can be selectively enabled or disabled by the MSO if desired, such as to achieve other operational or business goals. This can also be useful for maintenance modes, wherein such maintenance is scheduled into periods when the subscriber is not expected to make use of these features during a particular period of time. These capabilities can also be rapidly re-established should the subscriber wish to utilize them (e.g., in an "on-demand" fashion).

The present invention also lends itself to various business models in terms of distribution, operation, and equipment/service provisioning. Specifically, by using the technology of the present invention, the CPE 106 can also be reconfigured as a trusted domain for protected content received over the cable or satellite receiver (tuner). New versions or upgrades of software/firmware can readily be downloaded and installed as well. In that the present invention advantageously provides MSO control over the access, distribution and reproduction of content within the network (and to a degree beyond the MSO network), numerous different permutations of these features can be offered by the MSO as part of a subscription or incentive program. For example, a "basic" subscriber might be given a certain limited package of TD capabilities (e.g., no transmission of protected content outside of the TD, no recording to fixed media such as a CD-ROM, no "multi-room" DVR, etc.), while a higher level subscription package might include these capabilities, and yet others. Individual or groups of features or capabilities may also given to subscribers or prospective subscribers for limited periods of time, or under certain limited circumstances, as an incentive or trial.

One variant of the business methodology of the invention contemplates delivery of substantially similar or "generic" hardware/firmware environments to all subscribers, with the MSO able to tailor the CA, TD and DRM capabilities of their individual CPE 106 for their particular subscription level, needs and premises. For example, some users may have local recording devices (e.g., DVR or the like) which may require configuration of the trusted domain to extend to these devices to permit subscriber purchase and in-home "burning" of content according to the methods previously discussed with respect to U.S. patent application Ser. No. 11/080,693.

As can be appreciated, literally an unlimited number of different premises/subscriber-specific configurations may be employed consistent with the security download capability of the invention, and hence it is typically more economical and efficient to allow MSO reconfiguration of a substantially generic device, as opposed to custom configured hardware or software for each subscriber/premises.

In addition to the foregoing, the provisioning of the subscriber's CPE might be accomplished according to different approaches depending on factors such as the subscriber's subscription level, account status, etc. For example, premium subscribers might be sent their CPE 106 via a self-install kit, with the device being immediately provisioned upon installation (thereby giving the subscriber the fastest possible connection to the network without having to schedule a service appointment). Moreover, if the subscriber's account is delinquent, their service can be selectively shut of via the deactivation procedures of FIGS. 11 and 12 previously described. The activation/deactivation/reactivation can also be linked to a payment source (e.g., a credit card authorization or payment entity) so that the subscriber can go to a website or call a telephone number, provide their credit card number, and have their service immediately reactivated. This can also be linked to the customer service representative or order receiving entity within the MSO network, so that signing up for a subscription, payment, and activation can be almost immediate (e.g., in the case where the prospective subscriber has their own retail DSTB or the like).

In another aspect of the invention, the download and provisioning capability described herein is particularly useful in, inter alia, allowing for the migration of a client device (e.g., DVR or DSTB) from one location and/or parent network to another. For example, a subscriber of a given MSO might move across town, across the state, across the country, etc., and wish to keep their client device (which may, for example, have content saved thereon in a storage device). It may also be desirous for the MSO to avoid having to issue the subscriber a new device when they move. The download and provisioning paradigms described herein can be used to reconfigure the device after the move so as to operate at the new location; e.g., provide conditional access and a largely seamless transition for the subscriber. Hence, the present invention allows a device to be truly network- or conditional access-agnostic. The MSO may offer this migration service at a fee, as part of a subscription package feature, for free/incentive, and so forth (e.g., Time Warner "FastMove" service).

Conversely, the subscriber may not change location, but may want to change service providers. In this case, the new MSO can download and provision the device remotely, without having to issue a new device, set up a service call, etc. All access and privileges in the old MSO network can be revoked or erased, and the new privileges and access set up immediately.

The foregoing capability can also be extended to ASD/TD reconfiguration, and even feasibly other paradigms (e.g., DRM) with proper adaptation. This advantageously allows for, inter alia, portability of ASD-compliant devices between different networks and/or operators.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of delivering secure software over a network to a client device, comprising:
    entering information associated with said client device within at least one of a managed network control system or billing system of said network;
    coupling said client device to said network;
    establishing a network address for said client device;
    providing via a first entity for authenticating a device, device credentials along with a cryptographic element for said client device to a second entity for creating one or more software images, each of said one or more software images comprising an identical recreation of at least a portion of a microprocessor of said client device to which it is associated;
    returning a client device-specific personalized software image to said first entity from said second entity;
    returning a common software image to said first entity from said second entity;
    encrypting at least the device-specific image for said client device based at least in part on said cryptographic element; and
    sending via the first entity said encrypted device-specific image and said common image to a secure portion of said client device.

2. The method of claim 1, wherein said first entity comprises an authentication proxy, and said second entity comprises a personalization server.

3. The method of claim 1, wherein said device credentials are uniquely associated with a secure element of said client device.

4. The method of claim 3, wherein said personalized software image is uniquely associated with said secure element of said client device.

5. The method of claim 4, wherein said cryptographic element comprises a public key corresponding to a private key retained within said client device, said private key being adapted to decrypt said encrypted at least said device-specific image.

6. In a cable television network, a method of provisioning, for operation within said network, a client device having a security device substantially unique to said client device, the method comprising:
    acquiring a network address for said client device;
    placing an authentication entity in contact with said security device;
    authenticating said security device to said entity;
    obtaining personalization information associated with said security device based at least in part on said authenticating, said personalization information comprising a physically identical replication of at least a portion of a microprocessor associated to said client device;
    sending said personalization information to said security device over said network;
    obtaining a software image common to only those ones of a plurality of client devices having a common configuration and disposed within the network;
    sending said common software image to said security device over said network; and
    processing one or more messages at said client device in order to determine conditional access privileges.

7. The method of claim 6, further comprising decoding received content based at least in part on said privileges.

8. The method of claim 6, wherein said client device comprises a cable modem function, and said method further comprises conducting a cable modem registration process using at least said cable modem function.

9. The method of claim 8, wherein said cable modem function comprises a Data Over Cable Service Interface Specification (DOCSIS) compliant cable modem, and said network address comprises an Internet Protocol (IP) address.

10. The method of claim 6, wherein said authentication entity comprises software configured to authenticate said security device based at least in part on at least one cryptographic element received from said security device.

11. The method of claim 6, wherein said personalization information comprises a personalized software image substantially unique to said security device of said client device.

12. A method of doing business over a content-based network, comprising:
    selectively configuring at least one network client device based at least in part on a service request from a subscriber associated with said at least one device, said selective configuration comprising:
    entering information associated with said at least one device into a digital network control system (DNCS) of said network;
    generating a personalization image specific to said at least one client device when said at least one device is coupled into communication with said network, said personalization image comprising at least an identical replication of at least a portion of a microprocessor associated with said at least one client device;
    transmitting said personalization image and at least one non-unique software image to said at least one client device; and
    establishing at least one security permission or policy within a secure element of said at least one client device, said at least one permission or policy enabling provision of said requested service.

13. The method of claim 12, wherein said act of generating personalization data comprises generating an encrypted software image and cryptographic key that is unique to said secure element of said at least one client device.

14. The method of claim 12, wherein said coupling into communication is performed by said subscriber.

15. The method of claim 12, further comprising provisioning a cable modem function associated with said client device, said cable modem function being used to receive said transmitted data.

16. Network apparatus for use in providing secure content and software downloads to a plurality of client devices within a cable television network, the apparatus comprising:
    secure download infrastructure adapted for data communication with a trusted authority (TA);
    a media provisioning system in data communication with said infrastructure;
    a billing system in data communication with said provisioning system; and
    a media security system in data communication with said provisioning system;
    wherein said media provisioning system is configured to provide said secure content and software downloads to those ones of said plurality of client devices which have provided identifying information to said billing system and received from said media security system at least one device-specific software image and at least one software image common to those ones of said plurality of devices having a common configuration, said device-specific software image comprising a replicated version of at least a portion of a microprocessor associated to individual ones of said plurality of client devices.

17. The apparatus of claim 16, wherein:
    said secure download infrastructure and said TA cooperate to provide cryptographic elements and at least one secure client device software image for delivery by said infrastructure to said client devices; and
    said provisioning system and said security system determine and apply entitlements for selected ones of said client devices in order to authorize providing said cryptographic elements and said at least one software image thereto.

18. A network apparatus for provisioning a client device having a security device substantially unique to said client device, said apparatus comprising:
    a first interface to acquire a network address for said client device;
    an authentication apparatus configured to authenticate said substantially unique security device; and
    an apparatus to provide a secure software image and a device agnostic software image to said client device, said secure software image comprising an identical recreation of at least a portion of a microprocessor of said client device and enabling said client device to access secure programming content from said network;
    wherein said secure software image may be further utilized to enable said network apparatus to modify at least one security feature of said client device.

19. The network apparatus of claim 18, wherein said access to said secure content comprises received content decoded based at least in part on one or more conditional access privileges.

20. The network apparatus of claim 18, wherein said client device comprises a cable modem configured to communicate with said authentication apparatus during a registration process.

21. The network apparatus of claim 20, wherein said cable modem comprises a Data Over Cable Service Interface Specification (DOCSIS) compliant cable modem and said network address comprises an Internet Protocol (IP) address.

22. The network apparatus of claim 18, wherein said authentication apparatus comprises software configured to authenticate said substantially unique security device based at least in part on at least one cryptographic element received from said security device.

23. The network apparatus of claim 18, wherein said secure software image comprises a personalized software image substantially unique to said security device of said client device.

24. Apparatus to deliver secure software over a network to a client device, comprising:
    a first interface to a billing system of said network, said interface to enable entry of information associated with said client device, said entry of said information causing said client device to be coupled to said network;
    a media provisioning system configured to maintain said information associated with said client device;
    an authentication proxy configured to maintain a network address, credentials, and a cryptographic element for said client device;
    a personalization server configured to receive said credentials and said cryptographic element for said client device from said authentication proxy and return a client device-specific personalized software image and a common software image to said authentication proxy; and
    a second interface configured to transmit an encrypted version of said device-specific personalized software image and said common image to said client device, said encryption comprising encryption based at least in part on said stored cryptographic element for said client device;
    wherein said media provisioning system is utilized to select said authentication proxy and said personalization server via said information, said information comprising:
    information used to identify a secure microprocessor of said client device;
    information used to identify addresses corresponding to a specific authentication proxy and personalization server which will serve said client device; and
    information in regard to a software configuration of said client device; and
    wherein said client device-specific personalized software image comprises an identical version of at least a portion of a microprocessor associated to said client device.

25. The apparatus of claim 24, wherein said device credentials are uniquely associated with a secure element of said client device.

26. The apparatus of claim 25, wherein said personalized software image is uniquely associated with said secure element of said client device.

27. The apparatus of claim 26, wherein said cryptographic element comprises a public key corresponding to a private key retained within said client device, said private key being adapted to decrypt said encrypted version of said device-specific personalized software image.

* * * * *